■■■■ US011733046B2

(12) United States Patent
Spielman et al.

(10) Patent No.: US 11,733,046 B2
(45) Date of Patent: Aug. 22, 2023

(54) MULTI-MODAL TRANSPORTATION PROPOSAL GENERATION

(71) Applicant: Lyft, Inc., San Francisco, CA (US)

(72) Inventors: Charles Parker Spielman, San Francisco, CA (US); Mayank Gulati, San Francisco, CA (US); Karina Goot, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/595,399

(22) Filed: Oct. 7, 2019

(65) Prior Publication Data

US 2021/0102812 A1 Apr. 8, 2021

(51) Int. Cl.
*G01C 21/20* (2006.01)
*G01C 21/34* (2006.01)

(52) U.S. Cl.
CPC ......... *G01C 21/20* (2013.01); *G01C 21/3423* (2013.01); *G01C 21/3453* (2013.01)

(58) Field of Classification Search
USPC .......................................................... 701/41
See application file for complete search history.

(56) References Cited

U.S. PATENT DOCUMENTS

| | | |
|---|---|---|
| 6,208,934 B1 | 3/2001 | Bechtolsheim et al. |
| 8,489,641 B1 * | 7/2013 | Seefeld ................ G06F 16/248 707/792 |
| 9,057,612 B1 * | 6/2015 | Savvopoulos ..... G01C 21/3676 |
| 9,679,487 B1 | 6/2017 | Hayward |
| 9,713,963 B2 | 7/2017 | Liu et al. |
| 9,752,890 B2 | 9/2017 | Meisels et al. |
| 10,248,120 B1 | 4/2019 | Siegel et al. |
| 10,248,913 B1 * | 4/2019 | Gururajan .............. G06Q 50/30 |
| 10,249,120 B2 | 4/2019 | Ahearn et al. |
| 10,331,727 B2 * | 6/2019 | Naghdy .................. G06T 11/60 |

(Continued)

OTHER PUBLICATIONS

NPL, Lee, Misuk et al., An Analysis of Destination Choice for Opaque Airline Products Using Multi-dimensional Binary Logit Models, .Transportation Research, Part A, 46 (2012) (http://dx.doi.org/10.1016/j.tra.2012.08.009).*

(Continued)

*Primary Examiner* — Jean Paul Cass
(74) *Attorney, Agent, or Firm* — Keller Preece PLLC

(57) ABSTRACT

Methods and systems for generating multi-modal transportation proposals are presented. In one embodiment, a system is provided that includes a processor and a memory storing instructions. The processor may execute the instructions to receive a request for transportation from an origin location to a destination location and to generate a proposal identifying a route between the origin location and destination location. Generating the proposal may include determining a primary modality for a primary segment with a primary starting location and a primary ending location. A starting portion may be identified from the origin location to the primary starting location and an ending portion may be identified from the primary ending location to the destination location. A secondary modality may be identified for transportation along the starting portion and/or the ending portion. The primary and secondary modality may be assigned to the proposal, which may be transmitted to a mobile device.

20 Claims, 15 Drawing Sheets

(56) References Cited

U.S. PATENT DOCUMENTS

| | | | |
|---|---|---|---|
| 10,371,539 B2* | 8/2019 | Broyles | G01C 21/362 |
| 10,408,624 B2* | 9/2019 | Salowitz | G01C 21/3682 |
| 10,419,878 B1* | 9/2019 | Sanchez | H04W 4/021 |
| 10,545,026 B1 | 1/2020 | Schaefer | |
| 10,746,555 B1 | 8/2020 | Spielman et al. | |
| 2005/0187707 A1* | 8/2005 | Yokota | G01C 21/3476 |
| | | | 701/410 |
| 2005/0251331 A1* | 11/2005 | Kreft | G01C 21/00 |
| | | | 701/438 |
| 2007/0073562 A1* | 3/2007 | Brice | G06Q 10/02 |
| | | | 705/5 |
| 2008/0208443 A1* | 8/2008 | Massie | G01C 21/00 |
| | | | 701/532 |
| 2008/0248815 A1 | 10/2008 | Busch | |
| 2009/0177387 A1* | 7/2009 | Liu | G01C 21/20 |
| | | | 701/533 |
| 2009/0271109 A1 | 10/2009 | Lee et al. | |
| 2009/0319163 A1 | 12/2009 | Sutter et al. | |
| 2011/0004047 A1 | 2/2011 | Uyama | |
| 2012/0010816 A1 | 1/2012 | Uyama et al. | |
| 2012/0173134 A1 | 7/2012 | Gutman | |
| 2012/0173135 A1 | 7/2012 | Gutman | |
| 2013/0016012 A1 | 1/2013 | Beauregard | |
| 2013/0073323 A1* | 3/2013 | Zacharia | G06Q 10/025 |
| | | | 705/5 |
| 2013/0253833 A1* | 9/2013 | Tuukkanen | G01C 21/36 |
| | | | 701/538 |
| 2014/0000594 A1 | 1/2014 | Paek et al. | |
| 2014/0006215 A1* | 1/2014 | Hornthal | G06Q 10/02 |
| | | | 705/26.1 |
| 2014/0052714 A1* | 2/2014 | Brodziak | G06F 16/24575 |
| | | | 707/722 |
| 2014/0351037 A1* | 11/2014 | Shaam | G06Q 30/0222 |
| | | | 705/14.23 |
| 2014/0365113 A1* | 12/2014 | McGavran | G01C 21/3661 |
| | | | 701/425 |
| 2015/0032366 A1 | 1/2015 | Man et al. | |
| 2015/0081418 A1* | 3/2015 | Sahai | G06Q 30/0259 |
| | | | 705/14.41 |
| 2015/0160028 A1* | 6/2015 | Burrows | G01C 21/3484 |
| | | | 701/527 |
| 2015/0187107 A1* | 7/2015 | Vander Mey | G06Q 50/01 |
| | | | 345/629 |
| 2015/0253143 A1* | 9/2015 | Bailiang | G09B 29/106 |
| | | | 701/527 |
| 2016/0031506 A1 | 2/2016 | Lloyd et al. | |
| 2016/0076905 A1 | 3/2016 | Broadbent et al. | |
| 2016/0138925 A1* | 5/2016 | Takahashi | B60L 58/12 |
| | | | 701/533 |
| 2016/0203422 A1 | 7/2016 | Demarchi et al. | |
| 2016/0298977 A1* | 10/2016 | Newlin | G01C 21/20 |
| 2016/0320194 A1 | 11/2016 | Liu et al. | |
| 2016/0356603 A1 | 12/2016 | Hajj et al. | |
| 2016/0358471 A1* | 12/2016 | Hajj | G01C 21/3423 |
| 2016/0371800 A1* | 12/2016 | Kirshenboim | G06Q 50/12 |
| 2017/0123618 A1* | 5/2017 | Porcella | G06F 16/29 |
| 2017/0153113 A1* | 6/2017 | Gotoh | G01C 21/343 |
| 2017/0169366 A1* | 6/2017 | Klein | G06Q 50/30 |
| 2017/0185271 A1* | 6/2017 | Manoharan | G06Q 10/02 |
| 2017/0191841 A1 | 7/2017 | Marueli et al. | |
| 2017/0213273 A1* | 7/2017 | Dietrich | G01C 21/3461 |
| 2017/0268891 A1* | 9/2017 | Dyrnaes | G01C 21/3492 |
| 2017/0330111 A1* | 11/2017 | Vogel | G06Q 10/02 |
| 2017/0357914 A1 | 12/2017 | Tulabandhula et al. | |
| 2017/0358113 A1* | 12/2017 | Bray | G01C 21/367 |
| 2017/0359695 A1* | 12/2017 | Aerts | H04W 64/00 |
| 2017/0370735 A1 | 12/2017 | Salowitz | |
| 2018/0051995 A1 | 2/2018 | Delling et al. | |
| 2018/0052002 A1 | 2/2018 | Delling et al. | |
| 2018/0091604 A1* | 3/2018 | Yamashita | G06Q 50/30 |
| 2018/0113914 A1 | 4/2018 | Mehedy et al. | |
| 2018/0135989 A1 | 5/2018 | Schreier et al. | |
| 2018/0156623 A1* | 6/2018 | West | G01C 21/3423 |
| 2018/0204252 A1* | 7/2018 | Boulard | G06Q 30/0206 |
| 2018/0211337 A1* | 7/2018 | Ghaddar | G01C 21/3476 |
| 2018/0244288 A1* | 8/2018 | Glaser | B60W 40/08 |
| 2018/0341880 A1* | 11/2018 | Kislovskiy | G06Q 50/30 |
| 2018/0341881 A1* | 11/2018 | Kislovskiy | G06Q 50/30 |
| 2018/0341887 A1* | 11/2018 | Kislovskiy | G06Q 10/0635 |
| 2018/0341888 A1* | 11/2018 | Kislovskiy | G08G 1/096838 |
| 2018/0341895 A1* | 11/2018 | Kislovskiy | G06Q 10/04 |
| 2018/0342033 A1* | 11/2018 | Kislovskiy | G06Q 50/30 |
| 2018/0342034 A1* | 11/2018 | Kislovskiy | G06Q 10/06315 |
| 2018/0342113 A1* | 11/2018 | Kislovskiy | G08G 1/202 |
| 2018/0374032 A1 | 12/2018 | Pan et al. | |
| 2019/0017839 A1* | 1/2019 | Eyler | G01C 21/3638 |
| 2019/0046112 A1* | 2/2019 | Blanchard | G16H 20/10 |
| 2019/0056233 A1 | 2/2019 | Liu et al. | |
| 2019/0101401 A1 | 4/2019 | Balva | |
| 2019/0122315 A1* | 4/2019 | Valverde, Jr. | G06F 16/24575 |
| 2019/0146500 A1* | 5/2019 | Yalla | G01C 21/3602 |
| | | | 701/25 |
| 2019/0182626 A1* | 6/2019 | Miller | G01C 21/3492 |
| 2019/0219411 A1* | 7/2019 | Christen | G01C 21/3476 |
| 2019/0236743 A1* | 8/2019 | Bonanni, III | G06Q 20/127 |
| 2019/0251503 A1* | 8/2019 | Simpson | G06Q 30/08 |
| 2019/0251509 A1* | 8/2019 | Simpson | G06Q 30/08 |
| 2019/0272589 A1* | 9/2019 | Simpson | G06Q 50/30 |
| 2019/0277642 A1* | 9/2019 | Schmelzer | G01C 21/3453 |
| 2019/0301891 A1 | 10/2019 | Rowitch | |
| 2019/0318309 A1 | 10/2019 | Vaideeswaran et al. | |
| 2019/0318443 A1* | 10/2019 | Goldman-Shenhar | G06Q 50/30 |
| 2019/0318818 A1* | 10/2019 | Chaudhuri | G16H 20/40 |
| 2019/0327579 A1* | 10/2019 | Rankin, V | H04W 4/80 |
| 2019/0339087 A1* | 11/2019 | Jindal | G06N 3/088 |
| 2019/0340928 A1* | 11/2019 | Goldman | G08G 1/065 |
| 2019/0370924 A1* | 12/2019 | Kassn | G06Q 10/047 |
| 2019/0371472 A1* | 12/2019 | Blanchard | G16H 10/60 |
| 2019/0375301 A1 | 12/2019 | Whitt et al. | |
| 2019/0383623 A1 | 12/2019 | Aich et al. | |
| 2020/0041291 A1 | 2/2020 | Dunnette | |
| 2020/0051192 A1 | 2/2020 | Didier et al. | |
| 2020/0104761 A1 | 4/2020 | Aich et al. | |
| 2020/0104962 A1 | 4/2020 | Aich et al. | |
| 2020/0109956 A1 | 4/2020 | Nakamura et al. | |
| 2020/0117204 A1 | 4/2020 | Lindemann et al. | |
| 2020/0134765 A1 | 4/2020 | Majima et al. | |
| 2020/0191587 A1* | 6/2020 | Fuchs | G01C 21/3446 |
| 2020/0300645 A1* | 9/2020 | Schirano | G01C 21/343 |
| 2020/0410375 A1 | 12/2020 | Seagraves et al. | |
| 2021/0065114 A1 | 3/2021 | Thompson et al. | |

OTHER PUBLICATIONS

International Search Report and Written Opinion for App. No. PCT/US20/46673 dated Nov. 9, 2020 (8 pages).

U.S. Appl. No. 16/595,394, filed Dec. 19, 2019, Office Action.

U.S. Appl. No. 16/595,394, filed Jun. 9, 2020, Office Action.

U.S. Appl. No. 16/595,394, filed Oct. 15, 2020, Office Action.

U.S. Appl. No. 16/595,394, filed Sep. 17, 2021, Notice of Allowance.

U.S. Appl. No. 16/595,429, filed Jan. 8, 2020, Office Action.

U.S. Appl. No. 16/595,429, filed Jun. 5, 2020, Office Action.

U.S. Appl. No. 16/595,429, filed Oct. 8, 2020, Notice of Allowance.

U.S. Appl. No. 16/595,387, filed Jan. 9, 2020, Office Action.

U.S. Appl. No. 16/595,387, filed Jun. 11, 2020, Notice of Allowance.

U.S. Appl. No. 16/993,532, filed Dec. 8, 2021, Office Action.

Office Action as received in European application 20875579.3 dated May 13, 2022.

U.S. Appl. No. 16/993,532, filed Apr. 15, 2022, Notice of Allowance.

Office Action as received in Mexican application MX/a/2022/004182 dated Jun. 13, 2022 [no English translation available].

U.S. Appl. No. 17/648,148, filed Dec. 20, 2022, Ex Paret Quayle Action.

(56) References Cited

OTHER PUBLICATIONS

U.S. Appl. No. 17/816,201, filed Nov. 25, 2022, Office Action.

* cited by examiner

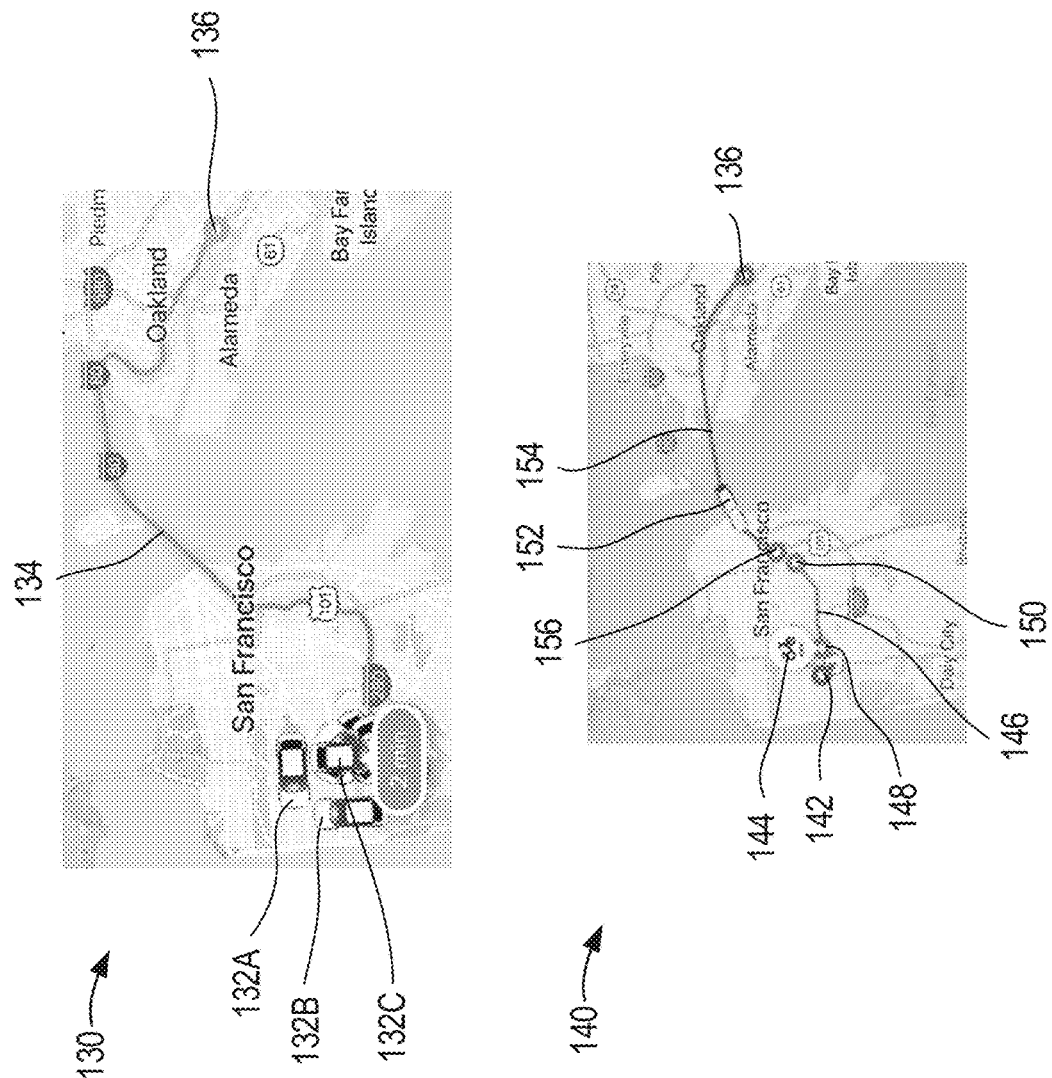

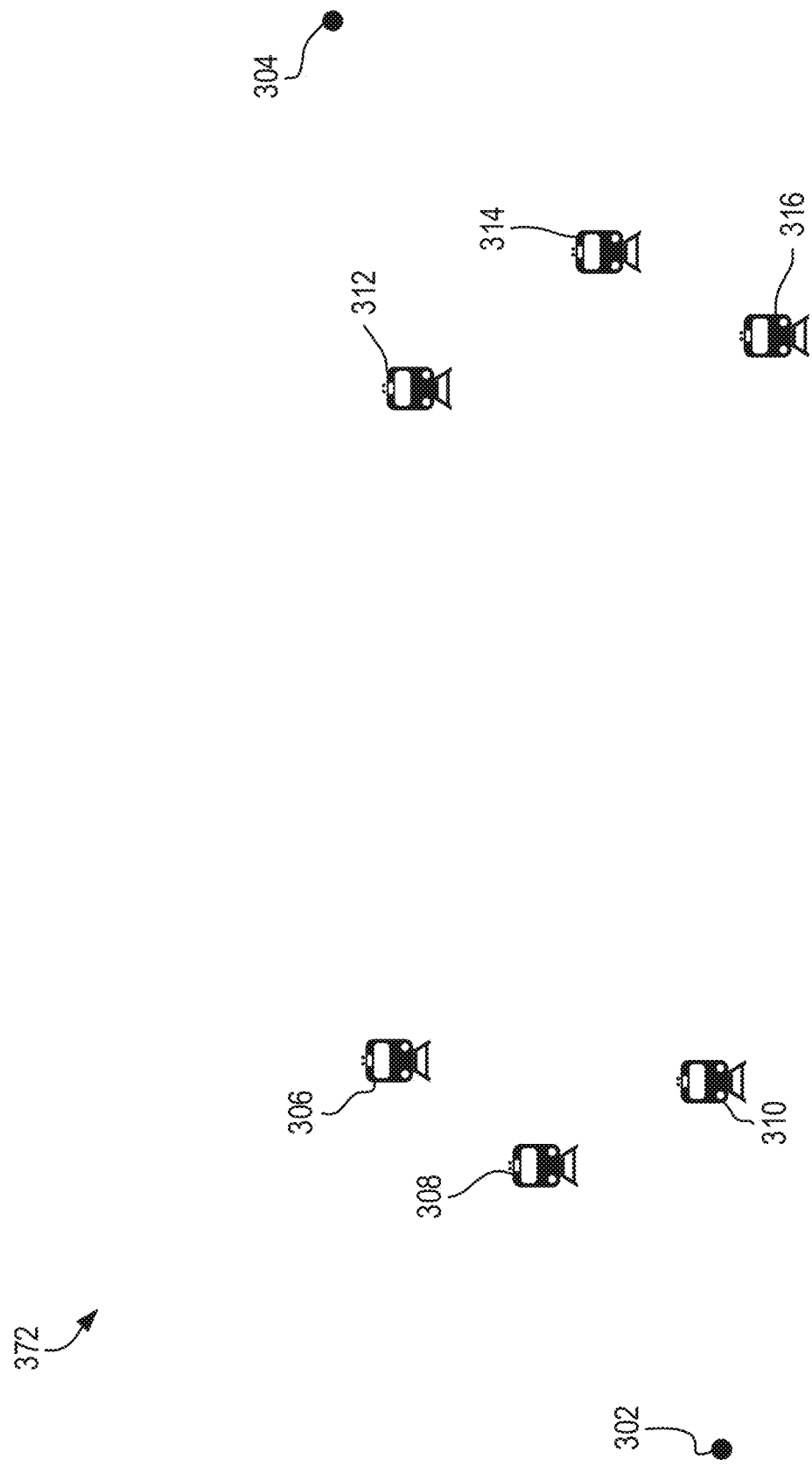

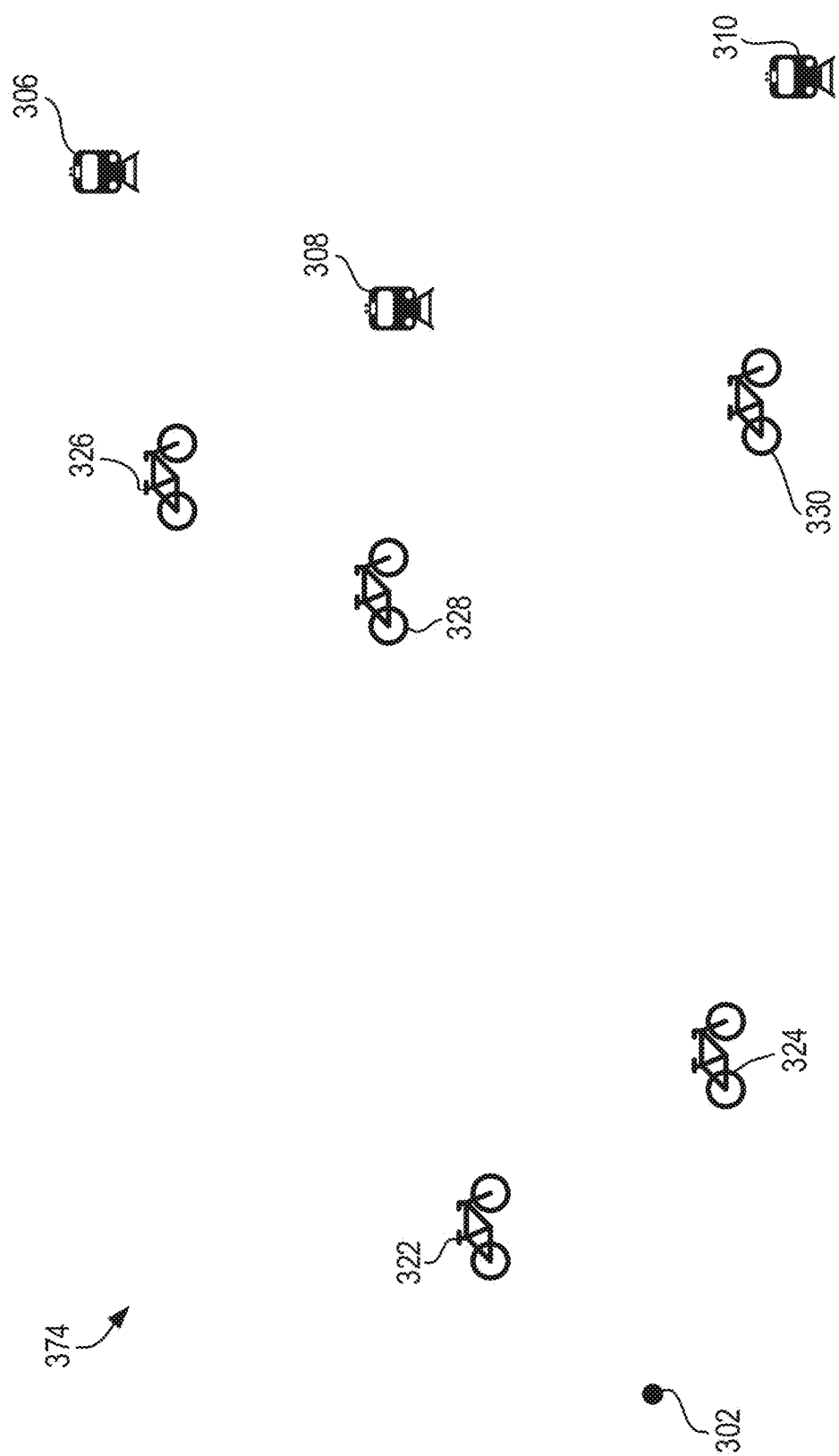

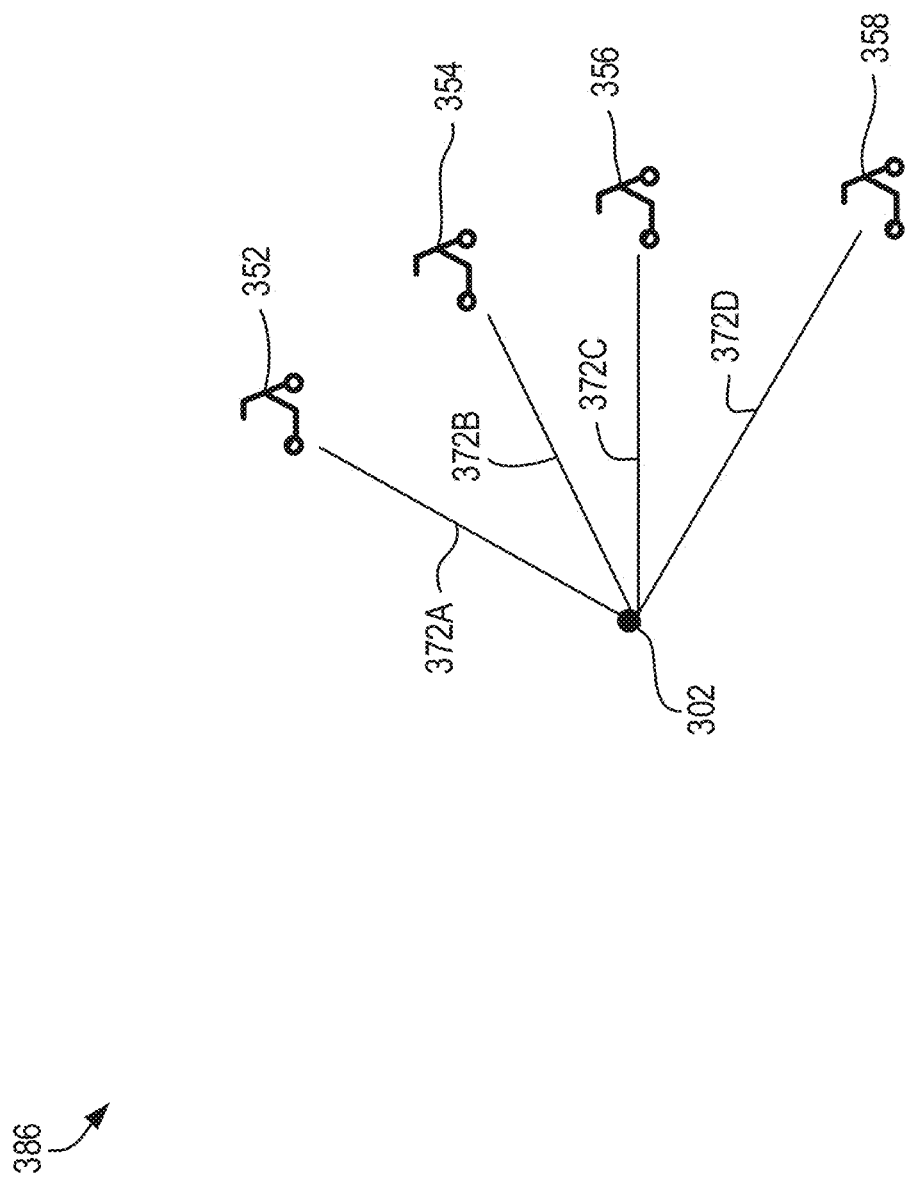

MULTI-MODAL TRANSPORTATION PROPOSAL GENERATION

BACKGROUND

Individuals desiring transportation (e.g., transportation by vehicle) between two locations can submit transportation requests to transportation providers. In particular, users may identify specific locations between which transportation is desired. In response, transportation providers may identify multiple modes of transportation that may be used to transport the user between the identified locations.

SUMMARY

The present disclosure presents new and innovative systems and method for generating multi-modal transportation proposals. In a first aspect, a system is provided comprising a processor and a memory. The memory stores instructions which, when executed by the processor, cause the processor to (a) receive a request for transportation from an origin location to a destination location and (b) generate a proposal identifying a route between the origin location and the destination location. The memory may store further instructions which, when executed by the processor while generating the proposal, cause the processor to (i) determine a primary modality for transportation along a primary segment with a primary starting location and a primary ending location and (ii) identify a starting portion of the route from the origin location to the primary starting location and an ending portion of the route from the primary ending location to the destination location. The memory may store still further instructions which, when executed by the processor while generating the proposal, cause the processor to (iii) determine, at least one secondary modality for transportation along at least one of the starting portion and the ending portion and (iv) assign the primary modality and the at least one secondary modality to the proposal. The memory may also store instructions which, when executed by the processor, cause the processor to (c) transmit the proposal to a mobile device for display on the mobile device.

In a second aspect according to the first aspect, the memory stores further instructions which, when executed by the processor while determining the primary modality, cause the processor to identify, according to location rules associated with the primary modality, locations of vehicles associated with the primary modality and identify, according to route rules associated with the primary modality, routes including one or more locations of vehicles associated with the primary modality. The memory may also store instructions which, when executed by the processor, cause the processor to select a primary route from among the routes, the primary route defined by a first location and a second location, identify the first location as the primary starting location and the second location as the primary ending location, and assign the primary route to the primary segment.

In a third aspect according to the second aspect, the location rules specify criteria for identifying locations of vehicles that comply with capabilities of vehicles associated with the primary modality.

In a fourth aspect according to the third aspect, the location rules specify identifying at least one of: (i) locations closest to the origin location and (ii) locations closest to the destination location.

In a fifth aspect according to the fourth aspect, the location rules specify identifying both (i) and (ii).

In a sixth aspect according to any of the second through the fifth aspects, the route rules specify criteria for identifying routes that comply with capabilities of vehicles associated with the primary modality.

In a seventh aspect according to the sixth aspect, the route rules specify identifying routes that comply with at least one of: a maximum distance requirement, a minimum distance requirement, a maximum time requirement, a minimum time requirement, a time-of-day requirement, and a maximum price requirement.

In an eighth aspect according to the second through the seventh aspects, at least one of the location rules and the route rules are based at least in part on a user profile associated with the mobile device.

In a ninth aspect according to any of the first through the eighth aspects, the memory stores further instructions which, when executed by the processor while performing (b)(iii), cause the processor to (A) determine at least two secondary modalities for transportation along at least one of the starting portion and the ending portion and (B) assign the at least two secondary modalities to at least two secondary segments for transportation along the at least one of the starting portion and the ending portion.

In a tenth aspect according to the ninth aspect, the at least two secondary modalities are determined for transportation along the starting portion. The memory also stores further instructions which, when executed by the processor while performing (b)(iii)(A), cause the processor to select a first secondary modality, identify, according to location rules associated with the first secondary modality, locations of vehicles associated with the first secondary modality, and identify, according to route rules associated with the first secondary modality, at least a first route from the origin location to at least one of the locations of vehicles associated with the first secondary modality and a second route from at least one of the locations of vehicles associated with the first secondary modality to the primary starting location.

In an eleventh aspect according to the tenth aspect, at least one of the first route and the second route is associated with a first secondary modality and wherein at least one of the first route and the second route is associated with a second secondary modality different from the first secondary modality.

In a twelfth aspect according to the eleventh aspect, at least one of the first secondary modality and the second secondary modality is selected from the group consisting of: transportation by bike, transportation by scooter, transportation by walking, and transportation by automobile.

In a thirteenth aspect according to any of the tenth through the twelfth aspects, the first route is from the origin location to a first location of the locations of vehicles associated with the first secondary modality and the second route is from the first location to the primary starting location.

In a fourteenth aspect according to any of the tenth through the thirteenth aspects, the first route is from the origin location to a second location of the locations of vehicles associated with the first secondary modality and the second route is from a third location of the locations of vehicles associated with the first secondary modality. The memory may also store instructions which, when executed by the processor, cause the processor to identify, according to the route rules associated with the first secondary modality, a third route from the second location to the third location.

In a fifteenth aspect according to the fourteenth aspect, the third route is associated with the first secondary modality and at least one of the first route and the second route is associated with a third secondary modality different from the first secondary modality.

In a sixteenth aspect according to any of the first through fifteenth aspects, the processor performs (b)(i) at least partially in parallel with (b)(ii) and/or (b)(iii).

In a seventeenth aspect according to any of the first through seventeenth aspects, the primary modality is selected from among two or more modalities, and wherein the memory stores further instructions which, when executed by the processor, cause the processor to repeat (b)(i) to (b)(iv) for each of the two or more modalities.

In an eighteenth aspect according to the seventeenth aspect, the two or more modalities include two or more of transportation by train, transportation by automobile, and transportation by bus.

In a nineteenth aspect, a method is provided comprising (a) receiving a request for transportation from an origin location to a destination location and (b) generating a proposal identifying a route between the origin location and the destination location. Generating the proposal may comprise (i) determining a primary modality for transportation along a primary segment with a primary starting location and a primary ending location and (ii) identifying a starting portion of the route from the origin location to the primary starting location and an ending portion of the route from the primary ending location to the destination location. Generating the proposal may further comprise (iii) determining, at least one secondary modality for transportation along at least one or the starting portion and the ending portion and (iv) assigning the primary modality and the at least one secondary modality, to the proposal. The method may further include (c) transmitting the proposal to a mobile device for display on the mobile device.

In a twentieth aspect according to the nineteenth aspect, determining the primary modality further comprises identifying, according to location rules associated with the primary modality, locations of vehicles associated with the primary modality and identifying, according to route rules associated with the primary modality, routes including one or more locations of vehicles associated with the primary modality. Determining the primary modality may further comprise selecting a primary route from among the routes, the primary route defined by a first location and a second location, identifying the first location as the primary starting location and the second location as the primary ending location, and assigning the primary route to the primary segment.

In a twenty-first aspect according to the twentieth aspect, the location rules specify criteria for identifying locations of vehicles that comply with capabilities of vehicles associated with the primary modality.

In a twenty-second aspect according to the twenty-first aspect the location rules specify identifying at least one of: (i) locations closest to the origin location and (ii) locations closest to the destination location.

In a twenty-third aspect according to the twenty-second aspect the location rules specify identifying both (i) and (ii).

In a twenty-fourth aspect according to any of the twentieth through the twenty-third aspects, the route rules specify criteria for identifying routes that comply with capabilities of vehicles associated with the primary modality.

In a twenty-fifth aspect according to the twenty-fourth aspect the route rules specify identifying routes that comply with at least one of: a maximum distance requirement, a minimum distance requirement, a maximum time requirement, a minimum time requirement, a time-of-day requirement, and a maximum price requirement.

In a twenty-sixth aspect according to any of the twentieth through the twenty-fifth aspects, at least one of the location rules and the route rules are based at least in part on a user profile associated with the mobile device.

In a twenty-seventh aspect according to any of the nineteenth through twenty-sixth aspects (b)(iii) further comprises (A) determining at least two secondary modalities for transportation along at least one of the starting portion and the ending portion and (B) assigning the at least two secondary modalities to at least two secondary segments for transportation along the at least one of the starting portion and the ending portion.

In a twenty-eighth aspect according to the twenty-seventh aspect the at least two secondary modalities are determined for transportation along the starting portion. The method, at (b)(iii)(A) may further comprise selecting a first secondary modality, identifying, according to location rules associated with the first secondary modality, locations of vehicles associated with the first secondary modality, and identifying, according to route rules associated with the first secondary modality, at least a first route from the origin location to at least one of the locations of vehicles associated with the first secondary modality and a second route from at least one of the locations of vehicles associated with the first secondary modality to the primary starting location.

In a twenty-ninth aspect according to the twenty-eighth aspect at least one of the first route and the second route is associated with a first secondary modality and wherein at least one of the first route and the second route is associated with a second secondary modality different from the first secondary modality.

In a thirtieth aspect according to the twenty-ninth aspect, at least one of the first secondary modality and the second secondary modality is selected from the group consisting of: transportation by bike, transportation by scooter, transportation by walking, and transportation by automobile.

In a thirty-first aspect according to any of the twenty-eighth through thirtieth aspects the first route is from the origin location to a first location of the locations of vehicles associated with the first secondary modality and the second route is from the first location to the primary starting location.

In a thirty-second aspect according to any of the twenty-eighth through thirty-first aspects, the first route is from the origin location to a second location of the locations of vehicles associated with the first secondary modality and the second route is from a third location of the locations of vehicles associated with the first secondary modality. The method may further comprise identifying, according to the route rules associated with the first secondary modality, a third route from the second location to the third location.

In a thirty-third aspect according to the thirty-second aspect the third route is associated with the first secondary modality and at least one of the first route and the second route is associated with a third secondary modality different from the first secondary modality.

In a thirty-fourth aspect according to any of the nineteenth through thirty-third aspects, (b)(i) is performed at least partially in parallel with (b)(ii) and/or (b)(iii).

In a thirty-fifth aspect according to any of the nineteenth through thirty-fourth aspects, the primary modality is selected from among two or more modalities. The method may further comprise repeating (b)(i) to (b)(iv) for each of the two or more modalities.

In a thirty-sixth aspect according to the thirty-fifth aspect, the two or more modalities include two or more of transportation by train, transportation by automobile, and transportation by bus.

In a thirty-seventh aspect, a non-transitory, computer-readable medium is provided storing instructions which, when executed by a processor, cause the processor to (a) receive a request for transportation from an origin location to a destination location and (b) generate a proposal identifying a route between the origin location and the destination location. The non-transitory, computer-readable medium may store further instructions which, when executed by the processor while generating the proposal, cause the processor to (i) determine a primary modality for transportation along a primary segment with a primary starting location and a primary ending location and (ii) identify a starting portion of the route from the origin location to the primary starting location and an ending portion of the route from the primary ending location to the destination location. The non-transitory, computer-readable medium may also store instructions which, when executed by the processor while generating the proposal, cause the processor to (iii) determine, at least one secondary modality for transportation along the starting portion and for transportation along the ending portion and (iv) assign the primary modality and the at least one secondary modality to the proposal. The non-transitory, computer-readable medium may store still further instructions which, when executed by the processor, cause the processor to (c) transmit the proposal to a mobile device for display on the mobile device.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 1B illustrates transportation routes according to exemplary embodiments of the present disclosure.

FIGS. 3A-3I illustrate a transportation proposal generation procedure according to an exemplary embodiment of the present disclosure.

DETAILED DESCRIPTION OF EXAMPLE EMBODIMENTS

Figure 1A:
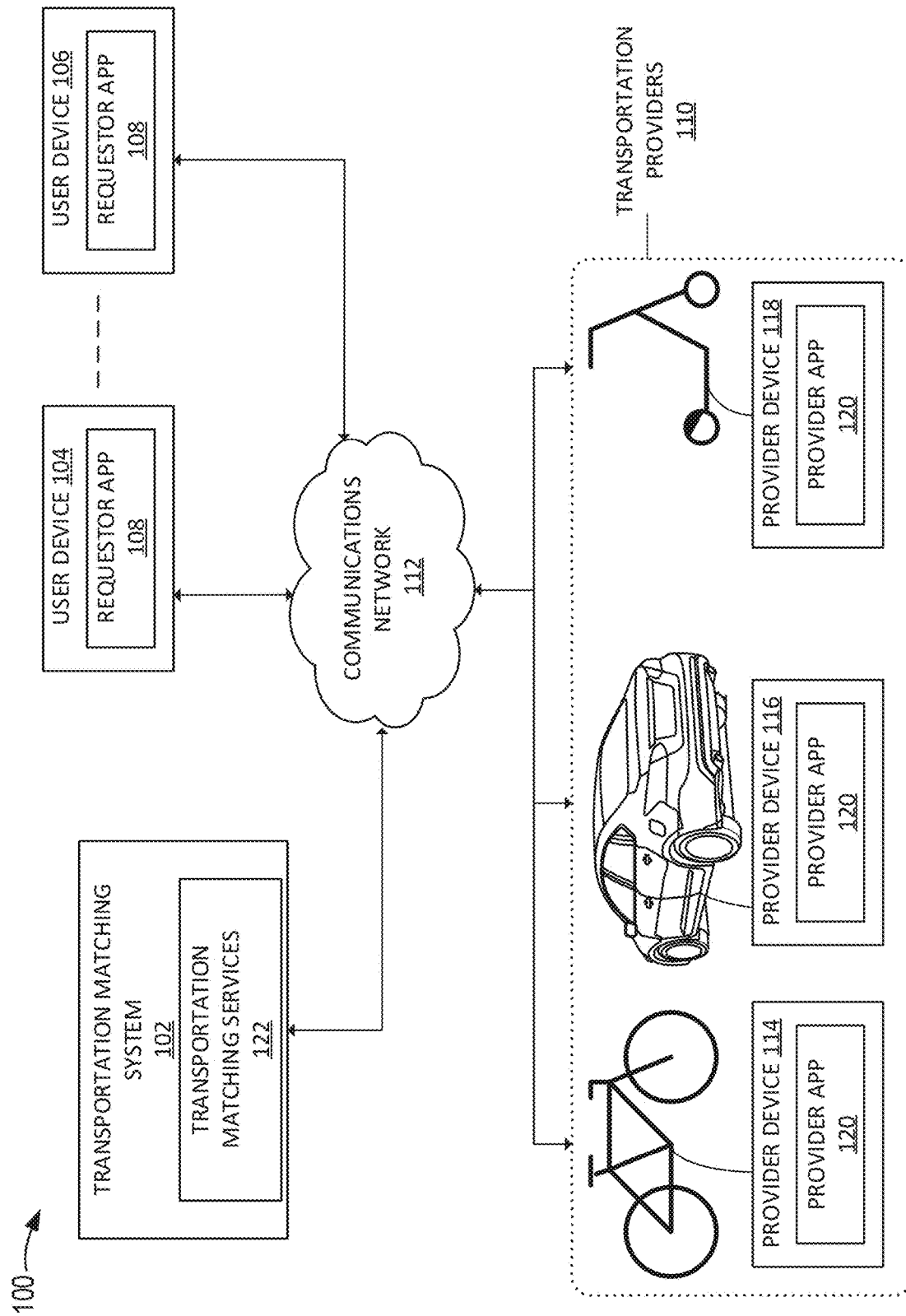
FIG. 1A illustrates a transportation matching system according to exemplary embodiments of the present disclosure.

Aspects of the present disclosure involve systems and methods for generating transportation proposals that identify a transportation route between an origin location and a destination location. The transportation route may include one or more transportation segments, each of which represents a specific segment of the transportation route that may be traveled along using a specific mode of transportation (e.g., a bike, scooter, automobile, train, bus and/or the like). The disclosed system implements recursive techniques to identify all available transportation segments for the transportation route. The system generates a transportation proposal that identifies the transportation route and one or more of the available transportation segments and transmits the generated transportation proposal to a user device (e.g., a mobile phone), thereby providing users with the ability to determine a route and/or mode of transportation best suited to support the user's transportation needs and/or service the user's transportation request. Techniques related to those discussed in the present disclosure are also discussed in (i) U.S. Application Ser. No. 16/595,429, filed on Oct. 7, 2019, and titled "TRANSPORTATION PROPOSAL FILTRATION, COMPARISON, AND INCONVENIENCE MEASUREMENT," (ii) U.S. Application Ser. No. 16/595,387, filed on Oct. 7, 2019, and titled "MULTI-MODAL TRANSPORTATION ROUTE DEVIATION DETECTION AND CORRECTION," and (iii) U.S. Application Ser. No. 16/595,384, filed on Oct. 7, 2019, and titled "TRANSPORTATION ROUTE PLANNING AND GENERATION." The disclosures of these applications are hereby incorporated by reference.

Various processes and systems currently exist for determining transportation proposals that identify transportation routes between two locations, such as an origin location and a destination location. For example, many transportation providers use such processes and systems to provision vehicles for transporting users from a first, starting location, to a second, ending location. Transportation providers may include transportation networking companies (TNCs). TNCs may implement a transportation system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set number of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

FIG. 1A illustrates an example system 100 for matching transportation requests to a network of transportation vehicles according to one embodiment of the present disclosure. As illustrated, a transportation matching system 102 may communicate with user devices 104-106 requesting transportation. In some examples, the user devices 104-106 requesting transportation may include a requestor app 108 implemented by the transportation provider. The requestor app 108 may represent any application, program, and/or module that may provide one or more services related to requesting transportation services. For example, the requestor app 108 may include a transportation matching application for requestors. In some examples, the requestor app may match the user of the requestor app 108 (e.g., a transportation requestor) with transportation providers 110 through communication with the transportation matching system 102 via the communications network 112. In addition, the requestor app 108 may provide the transportation matching system 102 with information about a requestor (including, e.g., the current location of the requestor) to enable the transportation matching system 102 to provide dynamic transportation matching services for the requestor and one or more transportation providers 110, each of which may include a provider device 114, 116, 118. Each provider device may include a provider app 120, which may be any application program and/or set of instructions that may provide one or more services related to operating a vehicle and/or providing transportation matching services in conjunction with the transportation matching system 102 and the requestor app 108.

In some examples, the requestor app 108 may coordinate communications and/or a payment between a requestor and a transportation provider 110. According to some embodiments, the requestor app 108 may provide a map service, a navigation service, a traffic notification service, and/or a geolocation service. The provider app 120 may provide similar functions. In other implementations, the requestor app 108 may allow users to request access to certain vehicles, such as personal mobility vehicles (e.g., bikes and/or scooters).

The transportation matching system 102 may arrange transportation on an on-demand and/or ad-hoc basis by, e.g., matching one or more transportation requestors with one or more transportation providers 110. For example, the transportation matching system 102 may provide one or more transportation matching services 122 for a networked transportation service, a ridesourcing service, a taxicab service, a automobile-booking service, an autonomous vehicle service, a personal mobility vehicle service, or some combination and/or derivative thereof. The transportation matching system 102 may include and/or interface with any of a variety of subsystems that may implement, support, and/or improve the transportation matching services 122. For example, the transportation matching services 122 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the trustworthiness of a requestor and/or a provider), a payment system, and/or an autonomous or semi-autonomous driving system. The transportation matching system 102 may be implemented on various platforms, including a requestor-owned mobile device, a computing system installed in a vehicle, a server computer system, or any other hardware platform capable of providing transportation matching services to one or more requestors and/or providers.

Existing transportation matching systems are typically configured to identify and provide a particular modality of transportation between starting and ending locations. For example, FIG. 1B depicts a transportation route 130 identifying a particular modality of transportation between a starting location (not labelled) and an ending location 136. The transportation route 130 includes a single transportation segment 134 between the starting location and the ending location 136. The transportation segment 134, as generated, is to be serviced by one of the automobiles 132A-C. For example, a user requesting transportation from the starting location to the ending location 136 may be picked up by one of the automobiles 132A-C and driven along the route indicated by the transportation segment 134 to the ending location 136.

In certain implementations, the transportation matching system may analyze and/or recommend transportation routes using modalities other than automobiles. For example, where the starting location and ending location 136 are closer together (e.g., shorter rides), the transportation matching system may generate transportation routes that utilize a personal mobility vehicle (e.g., a bike or a scooter). As another example, the transportation matching system may determine that a given starting location and/or ending location 136 are near transit stops for public transportation systems. In such a scenario, the transportation matching system may generate a transportation route from the starting location that utilizes a public transportation modality (e.g., a bus or a train).

Typical transportation matching systems, however, may not be able to generate transportation routes that combine multiple modalities into a single transportation proposal. Therefore, such transportation matching systems cannot capture cost or time savings associated with combining multiple modalities into a single transportation proposal. For example, in certain instances (e.g., during rush hour traffic), automobile-based modalities may be comparatively slower than other modalities, such as bikes or scooters. As another example, during rush hour or periods of high road congestion, it may be faster to take the train (i.e., use a public transit modality) between the two locations rather than to drive (i.e., use a automobile modality) between the two locations. In such a scenario, existing transportation matching systems may recommend public transportation modalities between starting and ending locations for users located near transit stops. But such a recommendation may not be useful for all users. For instance, users that are not in close proximity to a transit stop may have to walk long distances over a significant amount of time to access the transit stop from their starting location. Alternatively, such users may have to walk long distances over a significant amount of time to leave a transit stop and arrive at their ending location. In either scenario, using public transportation may be slower than traveling by automobile. Such users may therefore be recommended transportation routes using automobiles, such as the automobiles 132A-C.

Nevertheless, even users located far away from public transportation may receive faster transportation if they were able to use other modalities for transportation to the transit stops. For example, FIG. 1B also depicts a transportation route 140 for transportation between starting location 142, which corresponds to the starting location of the transportation route 130, and ending location 136. Rather than fulfilling the entire transportation route 140 with a single modality as in the transportation route 130, the transportation route 140 includes two transportation segments 146, 154 fulfilled by two different modalities (e.g., two different types of vehicles 144, 152). In particular, transportation segment 146 is fulfilled by bike 144 and transportation segment 154 is fulfilled by train 152. While following the transportation route 140, a user may walk from starting location 142 to location 148 at the beginning of the transportation segment 146 and pick up a bike 144 (e.g., a docked or dockless bike available for short term rental and/or use). The user can then ride the bike 144 from the location 148 to the location 150 at the end of the transportation segment 146 and drop off the bike 144 (e.g., at a bike dock or bike rack) before walking to location 156 at the start of segment 154. The location 156 may correspond to a transit station (e.g., a train station), and the user may board the train 152 for transportation to the ending location 136 at the end of the segment 154.

By generating transportation routes with multiple modalities, the transportation matching system may combine the benefits of each type of modality. For example, bikes, scooters, and/or walking may be optimal for traveling short or medium distances (e.g., first-mile and last-mile legs of multi-modal transportation proposals), while automobiles and trains may be better for longer distances. Similarly, automobiles may be more flexible in scheduling and routing, but may be more expensive, while trains and buses may be less flexible but also less expensive. By combining any one of these modalities into a single transportation proposal, transportation routes such as the transportation route 140 may capitalize on the relative benefits of each type of modality. For example, during rush hour or periods of high road congestion, the transportation route 140 may be able to allow more users to quickly and conveniently access faster and less expensive transportation via trains 152 (in comparison to automobiles). In another example, transportation by automobile may be faster and easier if disparate passengers meet at a common pick-up location, or if new passengers travel to pick-up locations closer to an existing route for an operator. In such instances, transportation proposals can be generated that identify transportation routes that guide users to use personal mobility vehicles for transportation to such pick-up locations.

Therefore, there exists a need to generate transportation routes that utilize different modalities. Additionally, these transportation routes have to be generated quickly (e.g., in real-time) to allow for subsequent processing after generation of the transportation routes (e.g., filtering and ranking of the generated transportation routes) and before presentation of the transportation routes to a user. One way to solve these technical problems, among others, is to automatically divide a transportation route into multiple transportation segments and simultaneously identify modalities for each of the transportation segments. For example, one of the transportation segments of the transportation route may include a primary modality and cover a longer portion of the transportation route than the other transportation segments. The remaining transportation segments may include modalities that provide transportation from: 1) a starting location of the transportation route to an origin location of the primary modality; and 2) a destination location of the primary modality to an ending location of the transportation route. To enable faster generation of transportation routes with multiple modalities, the transportation route may be divided into transportation segments and the modalities for the transportation segments may be selected in parallel using recursive techniques.

Figure 2:
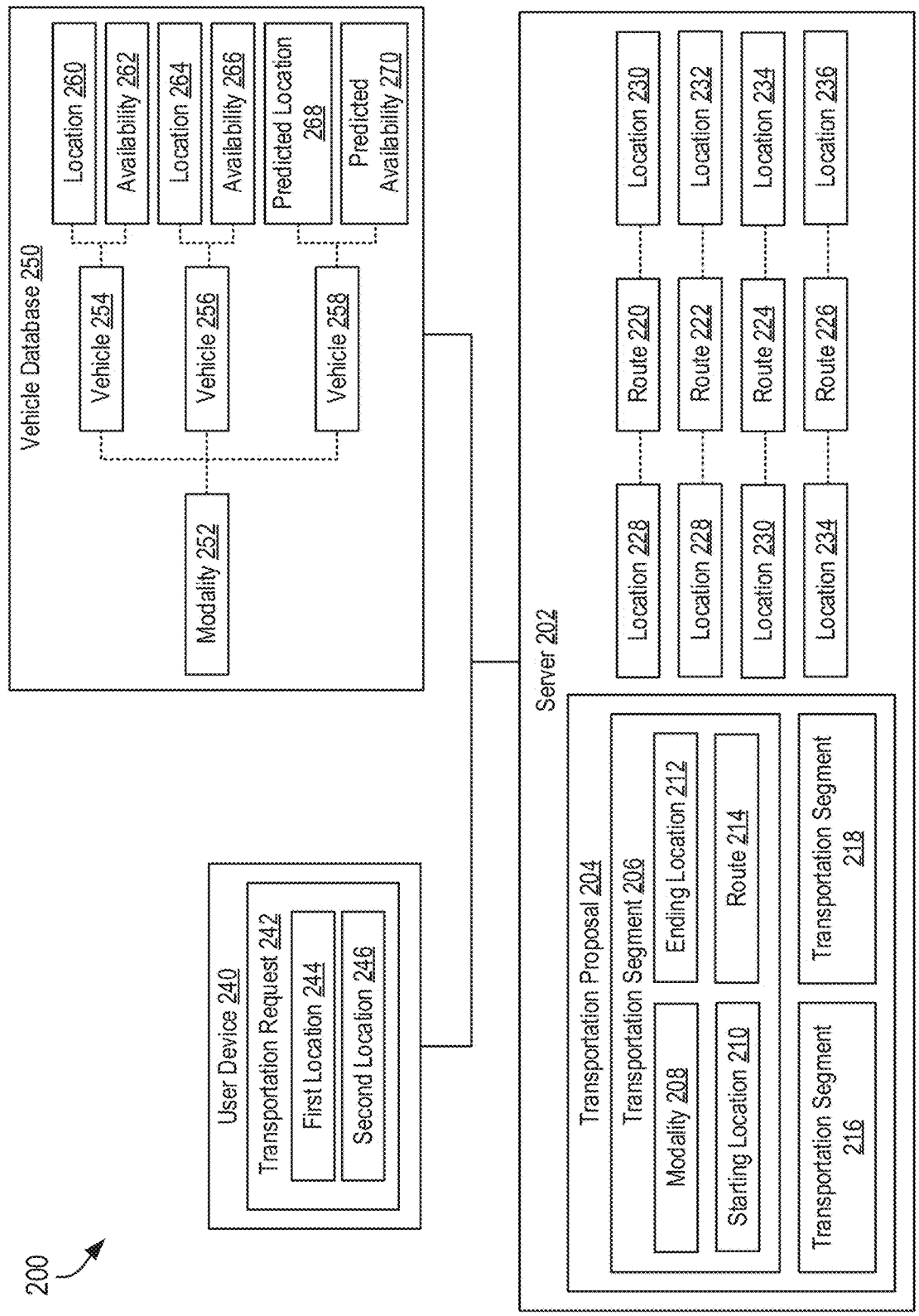
FIG. 2 illustrates a system according to an exemplary embodiment of the present disclosure.

FIG. 2 illustrates a system 200 according to an exemplary embodiment of the present disclosure. The system 200 includes a server 202, a user device 240, and a vehicle database 250. The server 202 may be configured to generate a transportation proposal 204 in response to transportation requests. For example, the server 202 may receive transportation request 242 from user devices 240 requesting transportation from a first location 244 to a second location 246 (e.g., in connection with implementing a transportation network and/or transportation matching system). In response to receiving the transportation request 242, the server 202 may generate the transportation proposal 204 that identifies a route for transportation between the first and second locations 244, 246. In generating the transportation proposal 204, the server 202 may create one or more transportation segments 206, 216, 218 that, in combination, identify the route for transportation between the first and second locations 244, 246. In the illustrated example, the transportation segment 206 includes a modality 208 identifying a type of transportation for the transportation segment 206. The transportation segment 206 also includes a starting location 210 and an ending location 212. In connection with the transportation segments 206, transportation may be provided from the starting location 210 to the ending location 212 according to the modality 208. The transportation segment 206 also includes a route 214, which may indicate the path followed from the starting location 210 to the ending location 212. Although not depicted, transportation segments 216, 218 may include similar information (i.e., a modality, starting location, ending location, and route). The transportation segments 206, 216, 218 may be serviced by two or more different modalities 208. For example, the transportation segment 206 may correspond to transportation by automobile, the transportation segment 216 may correspond to transportation by train, and the transportation segment 218 may correspond to transportation by personal mobility vehicle (e.g., bike, skateboard, and/or scooter).

To generate the transportation proposal 204, the server 202 may identify locations 228, 230, 232, 234, 236 between the first location 244 and the second location 246 (locations depicted multiple times indicate that the location may be associated with multiple routes, as will be explained in further detail below). The locations 228, 230, 232, 234, 236 may correspond to one or more modalities 208 (e.g., locations associated with vehicles capable of providing transportation according to one or more modalities 208).

The server 202 may generate routes 220, 222, 224, 226 between the locations 228, 230, 232, 234, 236. Two or more of the generated routes 220, 222, 224, 226 may have one or more locations in common. For example, routes 220, 222 both include location 228, routes 220, 224 both include location 230, and routes 224, 226 both include location 234. The server 202 may combine the generated routes 220, 222, 224, 226 to form a transportation proposal 204. For example, the server 202 may identify combinations of routes 220, 222, 224, 226 that combine to provide transportation from the first location 244 to the second location 246. In particular, the location 228 may correspond to the first location 244 and the location 236 may correspond to the second location 246. The server 202 may identify combination of routes 220, 224, 226 that combine to form a complete transportation route from the location 228 to the location 236. For example, route 220 provides transportation from location 228 to location 230, route 224 provides transportation from location 230 to location 234, and route 226 provides transportation from location 234 to location 236.

Each route 220, 224, 226 of an identified combination of routes may correspond to a separate transportation segment 206, 216, 218. For example, the route 220 may correspond to route 214 of the transportation segment 206, the location 228 may correspond to the starting location 210, and the location 230 may correspond to the ending location 212. In this way, the server 202 may generate transportation proposals. In particular, and as explained further below, the server 202 may identify many routes 220, 222, 224, 226 between locations associated with different modalities 208 and may combine the identified routes in various permutations to generate multiple transportation proposal(s) 204. The transportation proposal 204 may be processed to identify preferred or superior transportation proposals 204 for presentation to the user device 240. In certain implementations, the routes 220, 222, 224, 226 may be identified in parallel to reduce the time required to generate transportation proposals 204.

The vehicle database 250 stores information regarding vehicles 254, 256, 258. In particular, the vehicle database 250 stores vehicles 254, 256, 258 in association with a modality 252 identifying the type of transportation provided by the vehicles 254, 256, 258. In particular, the modality 252 may include one or more of transportation by automobile, transportation by train, transportation by bus, transportation by personal mobility vehicle (e.g., bike and/or scooter), and transportation by walking. The vehicle database 250 may also store locations 260, 264 and availabilities 262, 266 for vehicles 254, 256. The locations 260, 264 may identify current locations for the corresponding vehicles 254, 256. For example, where the modality 252 is transportation by automobile, the locations 260, 264 may indicate a current location of the vehicles 254, 256 (e.g., the automobiles). In another example, where the modality 252 is transportation by bikes (e.g., docked and/or dockless bikes), the locations 260, 264 may indicate a current docked location of the vehicles 254, 256 (e.g., the bikes). In particular, for docked bikes the locations 260, 264 may indicate the locations of stations with docks containing bikes that are available for rental. Further, for dockless bikes, the location 260, 264 may indicate the locations of bikes that are available for use (e.g., locations at which previous users of the dockless bikes left the bikes). The locations 260, 264 may also identify locations from which a user may access the vehicles 254, 256. For example, where the modality 252 is transportation by train, the locations 260, 264 may identify one or more train stations from which a user can board the trains. As another example, where the modality 252 is transportation by bus, the locations 260, 264 may identify one or more bus stops from which a user can board the buses. As a still further example, where the modality 252 is transportation by automobile and the automobile is operated autonomously, users may be required to be picked up and/or dropped off at predetermined locations. In such instances, the locations 260, 264 may identify the eligible pick-up and/or drop-off locations.

The availabilities 262, 266 may indicate whether a vehicle 254, 256 is currently available for use. For example, where the modality 252 is transportation by automobile, the availabilities 262, 266 may indicate whether the vehicles 254, 256 are available for passengers (e.g., whether the vehicle is currently providing transportation services and/or whether the vehicle has additional, vacant seats for additional passengers). As another example, where the modality 252 is transportation by scooter, the availabilities 262, 266 may indicate whether the corresponding vehicles 254, 256 are currently in use.

The server 202 may use the locations 260, 264 stored in association with the vehicles 254, 256 identify the locations 228, 230, 232, 234, 236 from which the routes 220, 222, 224, 226 are generated. The locations 260, 264 may be identified as being associated with the modality 252 and may be selected according to one or more location rules associated with the modality 252. When selecting the locations 260, 264, the server 202 may utilize the availabilities 262, 266 to filter one or more of the locations 260, 264. For example, the server 202 may only select locations 260, 264 for vehicles 254, 256 whose availabilities 262, 266 indicate that the vehicles 254, 256 are available.

The vehicle database 250 may also store predicted locations 268 and predicted availabilities 270 in association with certain vehicles 258. The predicted locations 268 may indicate an expected future location of the corresponding vehicle 258. In certain implementations, the predicted location 268 may be identified based on previous trends for the vehicle 258, or based on trends for vehicles similar to the vehicle 258 (e.g., vehicles of the same modality 252 located in the same or similar location at a same or similar time as a vehicle 258). In other implementations, the predicted location 268 may be determined based on current information associated with the vehicle 258. For example, if the vehicle 258 is currently fulfilling all or part of a transportation request, the predicted location 268 may be determined based on a future location (e.g., a destination location) associated with the transportation request. The predicted availability 270 may indicate an expected availability of the corresponding vehicle 258. The predicted availability 270 may be determined based on previous trends for the vehicle 258, previous trends for vehicles similar to the vehicle 258, or current route information associated with the vehicle 258, similar to the predicted location 268.

The server 202 may utilize predicted locations 268 and predicted availability 270 when identifying certain locations 228, 230, 232, 234, 236. For example, locations 260, 264 indicating the current location of vehicles 254, 256 may be used for earlier transportation segments 206 of the transportation proposal 204. However, such current location information may be less reliable in generating later transportation segments 218. For example, the transportation proposal 204 may include: 1) a transportation segment 206 corresponding to transportation by automobile from the first location 244 to a train station; 2) a transportation segment 216 corresponding to transportation by train to a second train station; and 3) a transportation segment 218 corresponding to transportation by scooter to the second location 246. In such instances, current locations for scooters located near the second train station may not be reliably used to generate the transportation segments 218 because these locations may change (e.g., as the scooters are used by other users). Accordingly, it may be necessary to use predicted locations 268 indicating expected future locations of the scooters to generate the transportation segments 218 and to identify corresponding locations and routes for the transportation segments 218.

The predicted availability 270 may be used to filter predicted locations 268 similar to the availabilities 262, 266. The server 202 may remove from consideration vehicles 258 whose predicted availabilities 270 indicate that the vehicle 258 is likely to be in use.

In certain implementations, the server 202 may select and/or filter locations 260, 264 and/or predicted locations 268 from the vehicle database 250 based on additional criteria. Locations may be selected based on current environmental factors near the locations (e.g., weather conditions). For example, locations 260, 264 and/or predicted locations 268 may be removed from consideration if the locations 260, 264 and/or predicted locations 268 are experiencing or are predicted to experience adverse weather conditions (e.g., high levels of rain, snow). Locations 260, 264 and/or predicted locations 268 may also be selected based on vehicle usage levels at or near the locations 260, 264 and/or predicted locations 268. For example, if high levels of users are accessing or predicted to access vehicles at a particular location, the location may be removed from consideration. The server 202 may also select locations 260, 264 and/or predicted locations 268 based on user preferences. For example, a user may typically access vehicles 254, 256, 258 of the modality 252 from particular locations (e.g., the user may utilize a preferred transit stop or a preferred automobile pick-up/drop-off location). The locations 260, 264 and/or predicted locations 268 may therefore be selected to include the user's preferred locations. As another example, a user may dislike accessing or may infrequently access vehicles from certain locations (e.g., locations that are far from a user's current location, locations that are physically difficult to access, and/or unsafe transit stops and/or automobile pick-up/drop-off locations). The locations 260, 264 and/or predicted locations 268 may therefore be selected to exclude disliked or infrequently accessed locations.

FIGS. 3A-3I illustrate a transportation proposal generation procedure that employs recursive techniques to identify transportation segments of the transportation proposal. The transportation proposal generation procedure includes multiples steps 370, 372, 374, 376, 378, 380, 382, 384, 386, which may be performed by the server 202 to generate one or more transportation proposals 204.

Referring initially to FIG. 3A, at step 370, locations 302, 304 may be identified. The locations 302, 304 may correspond to an origin location and a destination location for a transportation request. For example, the locations 302, 304 may correspond to the first location 244 and the second location 246 of a transportation request received from a user device 240.

Turning to FIG. 3B, at step 372, a primary modality is selected. As depicted, the primary modality is transportation by train. Referring to FIG. 2, the primary modality may be selected to constitute the longest transportation segment 206, 216, 218 of a transportation proposal 204 (e.g., to constitute the largest proportion of a total distance traveled, to constitute the largest proportion of a total travel time, to constitute the largest proportion of a total cost to the user). Also, the primary modality may be selected from among two or more primary modalities. For example, the primary modality may be selected from a list of primary modalities including transportation by train, transportation by automobile, and transportation by bus. Additionally or alternatively, the list may include transportation by a personal mobility vehicle. In certain implementations, the primary modality may be selected (e.g., selected from among the two or more primary modalities) based on one or more criteria. In certain implementations, the primary modality may be selected based on a distance between the locations 302, 304. For example, certain modalities (e.g., transportation by automobile, transportation by train, transportation by bus) may be better suited for travel over longer distances (e.g., distances exceeding one or two miles) and may therefore be preferentially selected when the locations 302, 304 are a larger distance apart. In further implementations, the primary modality may be selected based on a current time. For example, certain modalities (e.g., transportation by train, transportation by scooter, transportation by bus, transportation by bike) may be less susceptible to congested traffic conditions and may therefore be preferentially selected as the primary modality at times when traffic conditions are congested (e.g., when travel times by automobile are longer than transportation times by other modalities). In still further implementations, the primary modality may be selected based on a user preference associated with a received transportation request. For example, a user preference associated with a transportation request may indicate that a corresponding user prefers transit modalities (e.g., transportation by bus, transportation by train) over non-transit modalities (e.g., transportation by automobile, transportation by bike, transportation by scooter). The primary modality may therefore be preferentially selected to include transit modalities.

Referring again to FIG. 3B, locations 306, 308, 310, 312, 314, 316 associated with the primary modality may also be identified. The locations 306, 308, 310, 312, 314, 316 may be selected according to one or more location rules associated with the primary modality. For example, for transportation by train, the location rules may specify that the locations should be identified based on train stations located near location 302 and location 304. In particular, locations 306, 308, 310, 312, 314, 316 may be identified that are located nearest the locations 302, 304 and/or located within a predetermined threshold distance of the locations 302, 304.

Turning now to FIG. 3C, at step 374, the server 202 may select a second modality. The second modality may be selected to provide transportation at least partly between the location 302 and the locations 306, 308, 310 associated with the first modality. As depicted, the second modality is transportation by docked bikes located at stations in fixed locations. As with the primary modality, the second modality may be selected from among two or more modalities. For example, the second modality may be selected to be one or more of transportation by docked bikes, transportation by dockless bikes, transportation by scooter, transportation by automobile, transportation by bus, transportation by train (e.g., a different train than the primary modality), and transportation by walking. Similar to the primary modality, the second modality may be selected according to criteria including at least one of the distance between the location 302 and the locations 306, 308, 310 associated with the primary modality, a time at which the second modality will be utilized, and user preferences associated with the request for transportation.

The server 202 may also identify locations 322, 324, 326, 328, 330 corresponding to the second modality. Similar to the locations 306, 308, 310, 312, 314, 316 associated with the primary modality, the locations 322, 324, 326, 328, 330 associated with the second modality may be identified according to location rules associated with the second modality. For example, for transportation by docked bikes, the location rules may indicate that locations 322, 324, 326, 328, 330 of docks should be identified that are located nearest the location 302 and the locations 306, 308, 310 associated with the first modality.

Figure 3D:
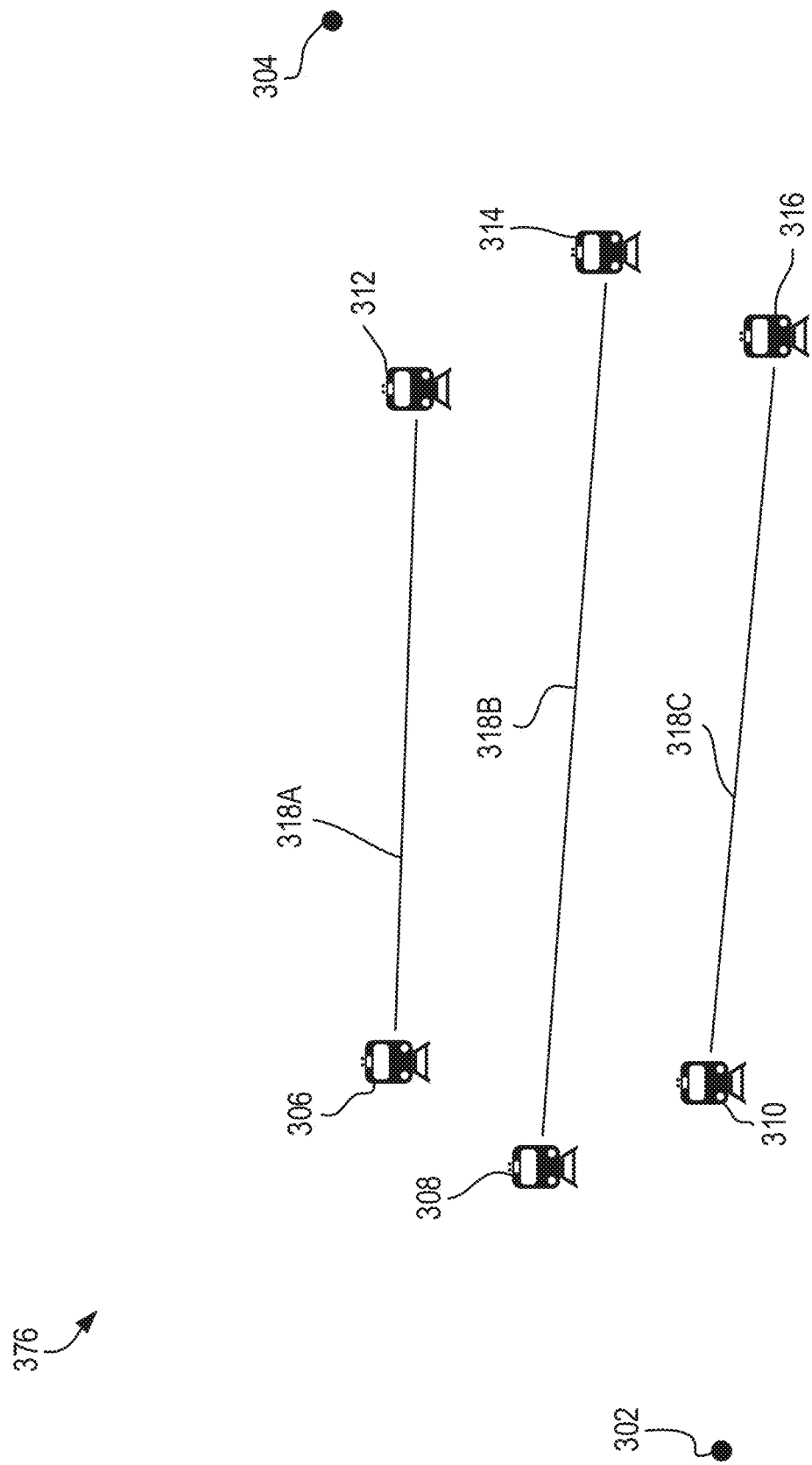

Turning now to FIG. 3D, at step 376, the server 202 may identify routes 318A-C between the locations 306, 308, 310, 312, 314, 316. In one specific example, the routes 318A-C may be identified according to route rules associated with the primary modality. The route rules may specify one or more criteria for identifying routes that comply with capabilities and or limitations of the primary modality (e.g., of vehicles associated with the modality). For example, for transportation by train, the route rules may specify identifying routes 318A-C based on scheduled train departures from the locations 306, 308, 310 near the location 302 that arrive at the locations 312, 314, 316 near the locations 304. As another example, the route rules may specify one or more of a maximum distance requirement for the distance covered by the primary modality, a minimum distance requirement for the distance covered by the primary modality, a maximum time requirement for a total travel time using the primary modality, a minimum time requirement for a total travel time using the primary modality, a time-of-day requirement for when the primary modality will be utilized, and a maximum price requirement for utilizing the primary modality.

Figure 3E:
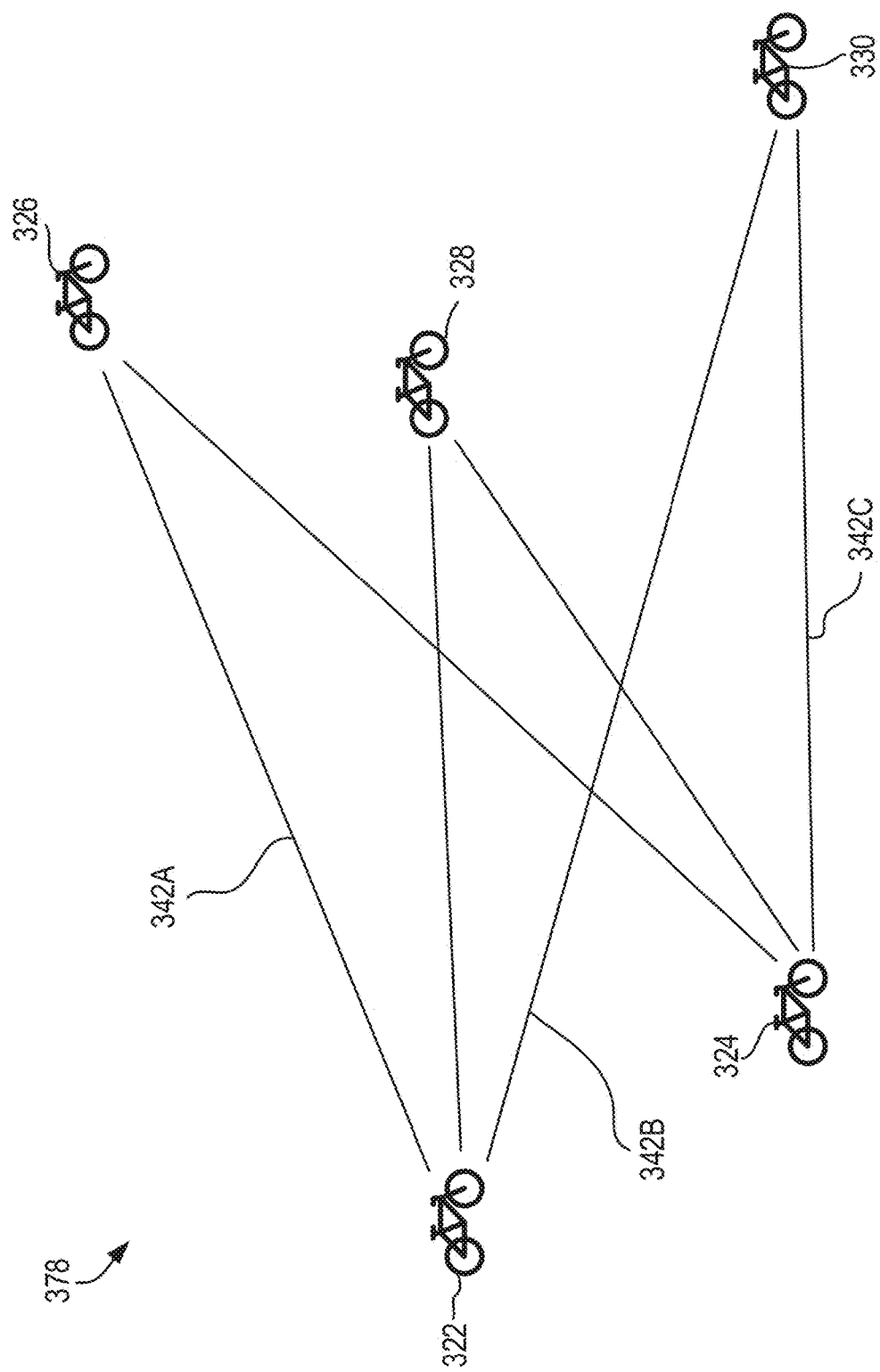

As illustrated in FIG. 3E, at step 378, the server 202 may identify routes 342A-C between the locations 322, 324, 326, 328, 330 associated with the second modality. In particular, the routes 342A-C may be identified according to one or more route rules associated with the second modality for transportation between the locations 322, 324, 326, 328, 330. For example, the routes 342A-C may be generated based on biking directions between the locations 322, 324, 326, 328, 330. In addition, the routes 342A-C may be identified according to constraints indicated in the route rules associated with the second modality. For example, the route rules may indicate that the routes 342A-C should not exceed a certain distance and/or should not exceed a time constraint (e.g., to limit overexertion by a user riding a bike). Additional route rule examples are discussed above in connection with route rules associated with the primary modality. One or more route rules similar to those discussed above may be used to generate routes associated with any of the modalities. For simplicity, only a subset of the routes identified are identified with reference numbers, but it should be understood that any reference to the routes 342A-C refer to all such routes between the locations 322, 324, 326, 328, 330.

Figure 3F:
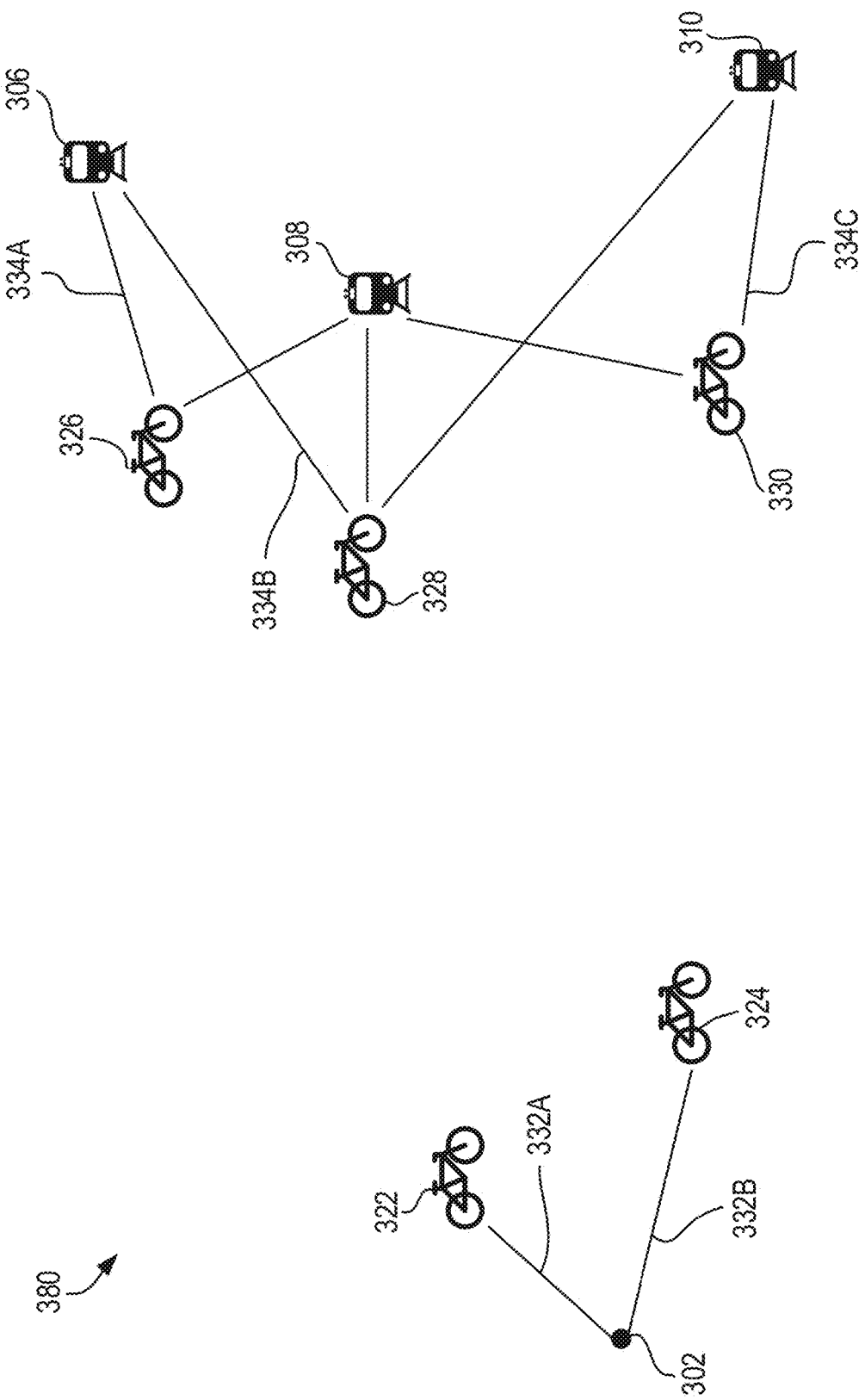
Figure 3G:
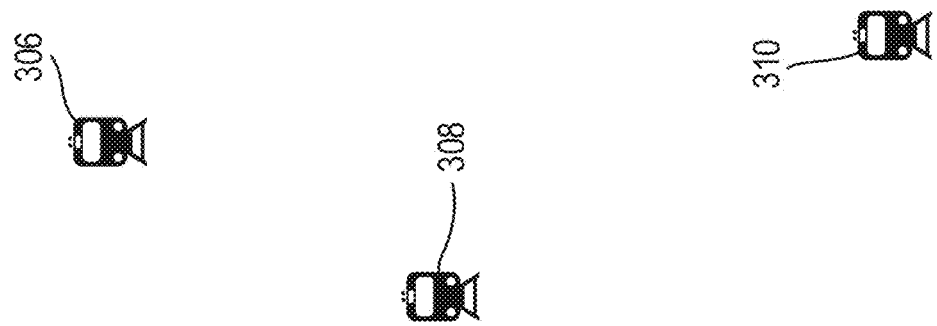
Figure 3G:
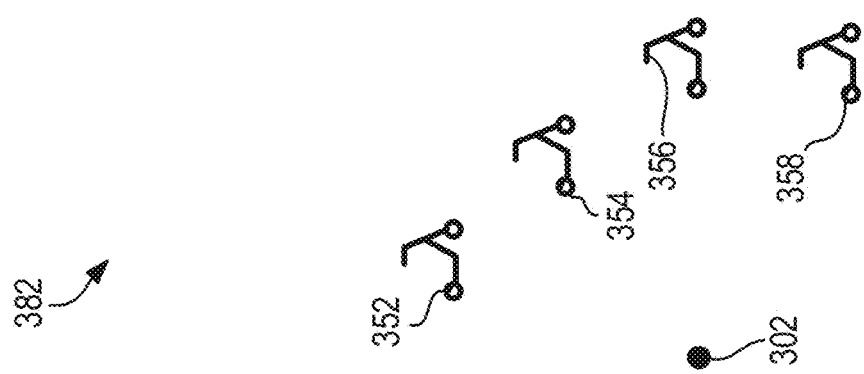

Turning now to FIG. 3F, at step 380, the server 202 may identify routes 322A-B between the location 302 and the locations 322, 324 associated with the second modality that is located nearest the location 302. The server 202 may also identify routes 334A-C between the locations 306, 308, 310 associated with the first modality and the locations 326, 328, 330 associated with the second modality. In certain implementations, the routes 332A-B and the routes 334A-C may be generated for a modality different from the second modality. For example, the routes 332A-B and the routes 334A-C (only a subset of which are identified by reference numbers) may be generated as walking routes between the locations 302, 306, 308, 310 and the locations 322, 324, 326, 328, 330 associated with the second modality (e.g., to walk to and from locations of the bikes).

Operations similar to those discussed in connection with steps 374, 376, 378, 380 may be performed to identify routes for transportation along an ending portion of the transportation route. For example, similar operations may be performed to identify routes from the locations 312, 314, 316 associated with the primary modality to the location 304.

Referring generally to FIGS. 3E-3F, once the routes 332A-B, 334A-C, 342A-C are identified, the server 202 may combine the routes 332A-B, 334A-C, 342A-C to identify routes from the location 302 to the locations 306, 308, 310 associated with the primary modality. For example, as described above, the server 202 may identify routes 332A-B, 334A-C, 342A-C with overlapping locations that combine to provide transportation from the location 302 to locations 306, 308, 310. These combined routes may be further combined with the routes 318A-C utilizing the primary modality, which may still further be combined with routes between locations 304, 312, 314, 316 to identify multiple routes between the locations 302, 304. These multiple routes may then be included in different transportation proposals. For example, the server 202 may identify a transportation proposal that includes the routes 332A, 342A, 334A, 318A. As another example, the server 202 may identify a transportation proposal based on the routes 332B, 342C, 334C, 318C. In particular, in certain implementations the server 202 may identify separate transportation proposals for all or a subset of the combinations of routes between the locations 302, 304.

Operations similar to those discussed in connection with steps 374, 376, 378, 380 may be performed to identify routes between location 302 and the locations 306, 308, 310 that utilize different modalities. For example, and referring initially to FIG. 3G, at step 382, the server 202 may identify locations 352, 354, 356, 358 associated with a third modality different from the second modality. As depicted, the third modality is transportation by scooter. The location 352, 354, 356, 358 may be identified according to location rules associated with the third modality. As explained above, the route rules may differ for each type of modality. For example, users may be allowed to ride scooters directly to a given location. Accordingly, the location rules associated with the third modality may specify that locations 352, 354, 356, 358 associated with the vehicles near the location 302 need to be identified, but that locations of vehicles associated with the third modality near the destination locations 306, 308, 310 need not be identified, unlike at step 374, where locations 326, 328, 330 near the locations were identified near the locations 306, 308, 310.

Figure 3H:
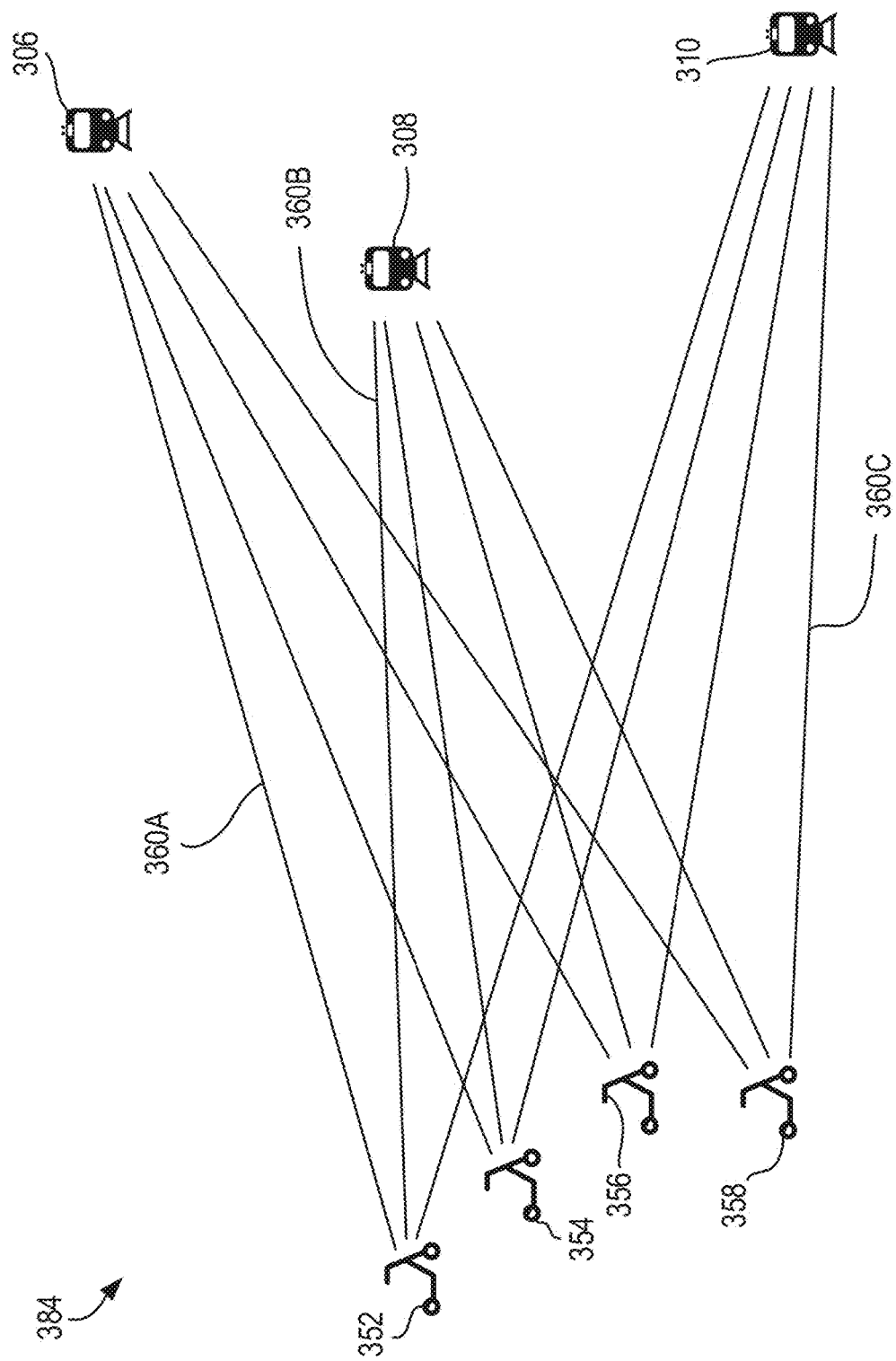

Turning to FIG. 3H, the server 202 may identify routes 360A-C between the locations 352, 354, 356, 358 associated with the third modality and the locations 306, 308, 310 associated with the primary modality (only a subset of the routes are identified using reference numerals). Similar to the routes 342A-C illustrated in FIG. 3E, the routes 360A-C of FIG. 3H may be identified according to route rules associated with the third modality. For example, in addition to the route rules discussed above, the route rules associated with the third modality may consider battery charge levels of the scooters located at locations 352, 354, 356, 358. The batteries for each scooter may have different levels of charge, changing the maximum travel range for the vehicles, and the routes 360A-C may be generated to account for these differences in travel range. For example, although a route is depicted between locations 352, 310, the scooter at location 352 may not have a sufficiently-charged battery to travel the distance between the locations 352, 310. Accordingly, the server 202 may not identify this route.

Referring to FIG. 3I, at step 370, the server 202 may generate routes 372A-D between the locations 302 and the locations 352, 354, 356, 358. Similar to the routes 332A-B (of FIG. 3F), the server 202 may generate the routes 372A-D as walking routes between the location 302 and the locations 352, 354, 356, 358, depending on the walking distance required. The server 202 may then combine the routes 372A-D with the routes 360A-C of FIG. 3H to generate routes between the locations 302 and locations 306, 308, 310 associated with the primary modality (e.g., using similar techniques to those discussed above in connection with the second modality).

Referring generally to FIGS. 3A-I, steps similar to steps 370, 372, 374, 376, 378, 380, 382, 384, 386 may be performed to identify routes that utilize further modalities. For example, the server 202 may maintain a list of available modalities further including, e.g., transportation by automobile, transportation by dockless bikes, transportation by walking, and transportation by bus. The server 202 may repeat steps similar to the steps 370, 372, 374, 376, 378, 380, 382, 384, 386 to identify routes according to one or more of such modalities. For example, the server 202 may identify locations associated with these modalities according to location rules associated with these modalities and may identify routes between the identified locations according to route rules associated with these modalities. Similarly, steps similar to the steps 370, 372, 374, 376, 378, 380, 382, 384, 386 may be repeated for different types of primary modalities. For example, one or more of the above-discussed modalities may be identified as a primary modality in certain implementations at step 370, and the subsequent steps may be repeated for other modalities.

All or part of the steps 370, 372, 374, 376, 378, 380, 382, 384, 386 may be performed at least partially in parallel. For example, the server 202 may be configured to recursively generate routes using the steps 370, 372, 374, 376, 378, 380, 382, 384, 386. For example, after identifying the locations 306, 308, 310, 312, 314, 316 at step 372, the server 202 may proceed with identifying routes associated with the second and third modalities (e.g., may perform one or more of the steps 374, 378, 380, 382, 384, 386) in parallel with identifying the routes 318A-C at step 376. Relatedly, after identifying the locations 322, 324, 326, 328, 330 associated with the second modality at step 374, the server 202 may identify the routes 332A-B, 334A-C, 342A-C between these locations 322, 324, 326, 328, 330 in parallel (e.g., may perform steps 378, 380 in parallel). Similarly, after identifying the locations 352, 354, 356, 358 associated with the third modality at step 382, the server 202 may proceed with identifying the routes 360A-C, 372A-D between these locations in parallel (e.g., may perform steps 384, 386 in parallel). Further, the server 202 may process the second and third modalities in parallel. In particular, steps 374, 378, 380 may be performed in parallel with steps 382, 384, 386. The server 202 may also generate routes between the locations 312, 314, 316 and the location 304 in parallel with generating routes between the locations 302 and the locations 306, 308, 310. These routes may similarly be generated using recursive techniques that enable consideration and route generation for multiple modalities in parallel. By recursively generating these routes, processing time required to generate transportation routes that utilize multiple modalities may be reduced because the computational complexities of these routes can be addressed in parallel, reducing computational latency and improving responsiveness to received transportation requests, such as transportation requests 242 received from user devices 240. Additionally, such a recursive framework allows for new modalities to be added to consideration without having to alter the overall proposal generation framework. For example, a new modality may be added to consideration by adding an indication of the new modality and one or both of location rules and route rules associated with the new modality. Subsequent proposal generation operations may then take the new modality in consideration without having to further alter the steps performed. Further, because the recursive framework allows for multiple operations to be performed in parallel, new modalities may be added without adversely extending overall proposal generation times.

Figure 4:
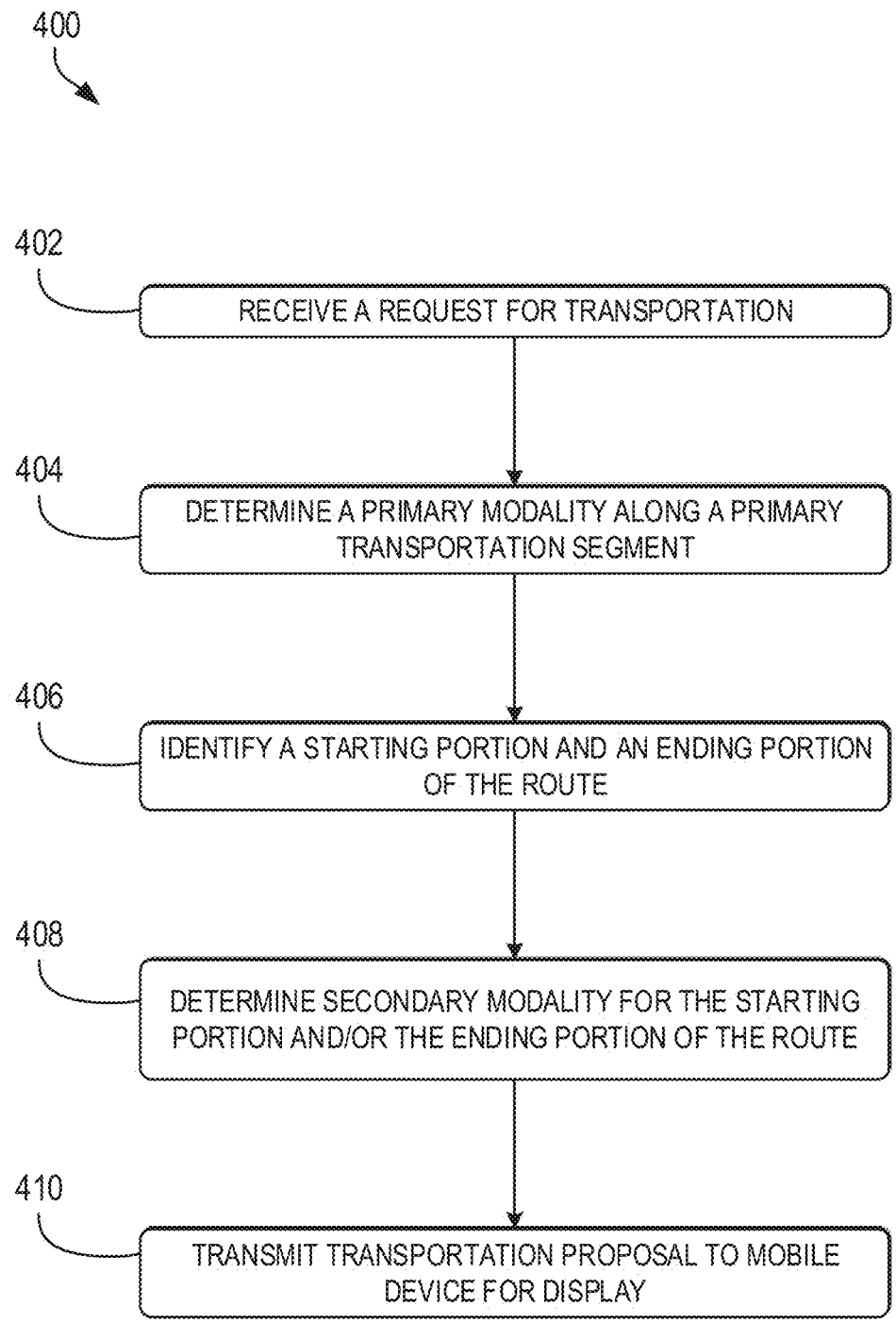
FIG. 4 illustrates a method according to an exemplary embodiment of the present disclosure.

FIG. 4 illustrates a method 400 according to an exemplary embodiment of the present disclosure. The method 400 may be performed to generate transportation proposals 204 that include multiple transportation segments 206, 216, 218 having different modalities 208 (as illustrated in FIG. 2). The method 400 may be implemented on a computer system such as the system 200. For example, the method 400 may be implemented by the server 202, the user device 240, and/or the vehicle database 250. The method 400 may also be implemented by a set of instructions stored on a computer readable medium that, when executed by a processor, cause the computer system to perform the method. For example, all or part of the method 400 may be implemented by a processor and memory of the server 202, the user device 240, and/or the vehicle database 250. Although the examples below are discussed with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a request for transportation (block 402). For example, and referring to FIG. 2, the server 202 may receive a transportation request 242 from a user device 240 requesting transportation from a first location 244 to a second location 246. In response to the transportation request, the server 202 may generate a transportation proposal 204 to provide transportation between the first and second locations 244, 246. The transportation proposal 204 may include a route for transportation between the first and second locations 244, 246 that includes multiple transportation segments.

To generate the transportation proposal, a primary modality may be selected for transportation along a primary transportation segment (block 404). For example, the server 202 may select a primary modality from two or more modalities that could be used for transportation along the primary transportation segment. In some examples, in connection with selecting the primary modality, the server 202 may identify locations associated with the primary modality. For example, the server 202 may identify locations 260, 264 and/or predicted locations 268 associated with vehicles 254, 256, 258 of the primary modality. The locations may be selected according to location rules associated with the primary modality that specify strategies, criteria or other requirements for selecting locations from which the primary modality may be used for transportation (e.g., that comply with the capabilities of vehicles associated with the primary modality). For example, and referring to FIG. 3, depending on the modality, the location rules may identify locations 306, 308, 310 near the first location (e.g., the location 302) and/or locations 312, 314, 316 near the second location (e.g., the location 304). The server 202 may identify routes between the locations 306, 308, 310, 312, 314, 316 associated with the primary modality and may select at least one of the routes as the primary transportation segment having a primary starting location and a primary ending location.

Returning to FIG. 4, a starting portion and an ending portion of the route may be identified (block 406). For example, and referring to FIG. 2, the server 202 may identify a starting portion of the route that occurs before the primary transportation segment and/or an ending portion of the route that occurs after the primary transportation segment. For example, the starting portion may be identified as the portion of the route from the first location 244 to the starting location of the primary segment and the ending portion may be identified as the portion of the route from the ending location of the primary segment to the second location 246.

Referring again to FIG. 4, a secondary modality may be determined for the starting portion and/or the ending portion of the route (block 408). For example, one or both of the starting portion of the route and the ending portion of the route may be divided into two or more transportation segments. Each of the transportation segments may have a correspond modality. As a specific example, the starting portion of the route divided into one transportation segment utilizing a second modality (e.g., transportation by walking) from the first location 244 to a location 260, 264 of a vehicle 254, 256 associated with a third modality (e.g., transportation by scooter). The starting portion may also include another transportation segment utilizing the vehicle 254, 256 from the location 260, 264 to the starting location of the primary transportation segment. Dividing the starting portion and/or the ending portion of the route is discussed further below in connection with FIG. 5 and the method 500. The primary transportation segment and the additionally-generated transportation segments may then be assigned to the transportation proposal.

The transportation proposal may be transmitted to a mobile device for display (block 410). For example, and referring to FIG. 2, the server 202 may transmit the transportation proposal 204 to the user device 240 from which the transportation request 242 was received. Upon receiving the transportation proposal 204, the user device 240 may display the transportation proposal 204 (e.g., on a display of the user device 240). For example, the user device 240 may display the transportation proposal 204 such that the user device 240 displays one or more of the modalities of the transportation proposal 204 (e.g., the primary modality and the secondary modality). The user device 240 may also display the route generated for the transportation proposal 204.

Blocks 404-408 may be repeated for each route associated with the primary modality. For example, where the primary transportation segment is selected at block 404 by identifying routes according to the primary modality, each of the routes identified may be separately identified as primary transportation segments for different transportation proposals. In such instances, blocks 404-408 may be repeated for each of the routes. Similarly, blocks 406-408 may be repeated for one or more modalities. For example, block 408 may be repeated for different types of secondary modalities, as discussed above in connection with the steps 374, 378, 380, 382, 384, 386. Furthermore, where these steps are repeated for different types of modalities, all or part of the blocks 404, 406, 408 may be repeated in parallel.

Figure 5:
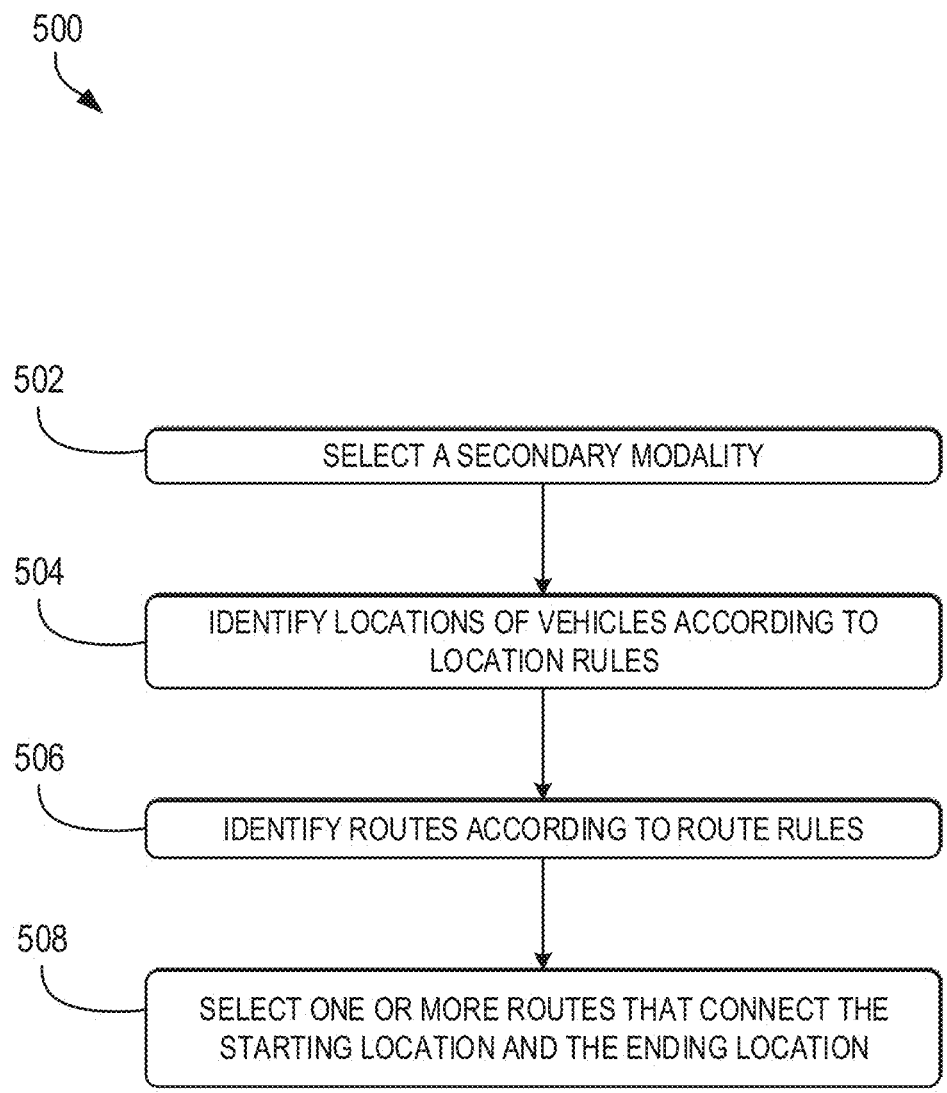
FIG. 5 illustrates a method according to an exemplary embodiment of the present disclosure.

FIG. 5 illustrates a method 500 according to an exemplary embodiment of the present disclosure. The method 500 may be performed to divide the starting portion and/or the ending portion into transportation segments and to identify modalities for the transportation segments. For example, the method 500 may be performed to implement block 408 of the method 400. The method 500 may be implemented on a computer system such as the system 200. For example, the method 500 may be implemented by the server 202, the user device 240, and/or the vehicle database 250. The method 500 may also be implemented by a set of instructions stored on a computer readable medium that, when executed by a processor, cause the computer system to perform the method 500. For example, all or part of the method 500 may be implemented by a processor and memory of the server 202, the user device 240, and/or the vehicle database 250. Although the examples below are discussed with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with selecting a secondary modality (block 502). For example, the secondary modality may be selected from two or more available modalities (e.g., transportation by bike, transportation by scooter, transportation by automobile,). In certain implementations, the secondary modality may be selected based on the primary modality. For example, each primary modality may have one or more secondary modalities from which the secondary modality may be selected. For example, where the primary modality is transportation by automobile, the secondary modality may be selected from one or more of transportation by bike, scooter, and/or walking. As another example, where the primary modality is transportation by train, the secondary modality may be selected from one or more of transportation by automobile, bus, bike, scooter, and/or walking. As a still further example, where the primary modality is transportation by bike (e.g., for shorter trips), the secondary modality may be selected from one or more of transportation by scooter and/or walking.

Based on the selected second modality, the server may identify locations of vehicles associated with the secondary modality according to location rules (block 504). For example, the server 202 may identify location rules associated with the secondary modality. The server 202 may then identify locations 260, 264 and/or predicted locations 268 associated with vehicles 254, 256, 258 of the secondary modality in the vehicle database 250.

The server 202 may identify routes between a starting location of the transportation segment, an ending location of the transportation segment, and the locations of the vehicles (block 506). The routes may be identified according to route rules associated with the secondary modality. For example, the route rules may specify a time or distance that the routes cannot exceed and/or other requirements (e.g., charge level considerations for scooters, preferred streets or paths for use with vehicles of the second modality). Identifying routes may include identifying routes that include the starting location of the portion being divided, the ending location of the portion being divided, and/or locations associated with the secondary modality, such as the routes 332A-B, 334A-C, 360A-C, 372A-D. In certain implementations, identifying the routes may also include identifying routes between two or more locations associated with the secondary modality, such as the routes 342A-C of FIG. 3E. The specific types of routes to be generated based on the route rules and/or current availabilities of 262, 266 and predicted availabilities 270 of vehicles 254, 256, 258 of the secondary modality.

In certain implementation, identifying these routes may include identifying routes 332A-B, 334A-C, 372A-D that correspond to a third modality (e.g., walking) that differs from the secondary modality. The third modality may be identified based on the secondary modality. For example, secondary modalities may have one or more associated tertiary modalities. For example, where the secondary modality is transportation by bike or scooter, the tertiary modalities may include transportation by walking. In another example, where the secondary modality is transportation by bus, the tertiary modalities may include transportation by bike, scooter, and/or walking. In certain implementations, such routes including the third modality may be identified recursively. For example, the third modality may be identified by repeating blocks 502, 504, 506 to identify routes before and/or routes associated with the secondary modality. In particular, the blocks 502, 504, 506 may be repeated until no further associated modalities remain. For example, the blocks 502, 504, 506 may be repeated until routes that rely on walking modalities are generated (e.g., until routes similar to the routes 332A-B, 334A-B, 372A-D)

The server 202 may then select one or more of the routes that connect the starting location and the ending location (block 508). For example, and with reference to FIG. 2, the server 202 may combine the identified routes to select routes connecting the starting and ending locations of the portion. In particular, as explained above, the routes may be combined to identify all combinations of routes that connect the starting and ending locations. In such implementations, each of the combinations may be used to generate separate transportation proposals 204. For example, the method 500 may be repeated to divide both the starting portion and the ending portion and to identify combinations of routes for each of the starting portion and the ending portion. The combinations may then be combined with one another and with the first transportation segment to generate multiple transportation proposals 204.

In certain implementations, the method 500 may be repeated for multiple secondary modalities. For example, where the secondary modality is selected from among one or more secondary modalities at block 502, the method 500 may be repeated for each of the secondary modalities. In particular, the method 500 may be repeated in parallel (e.g., recursively) for each of the secondary modalities. Such recursive executions may reduce the overall computing time required to identify routes for the starting portion and/or the ending portion.

Figure 6:
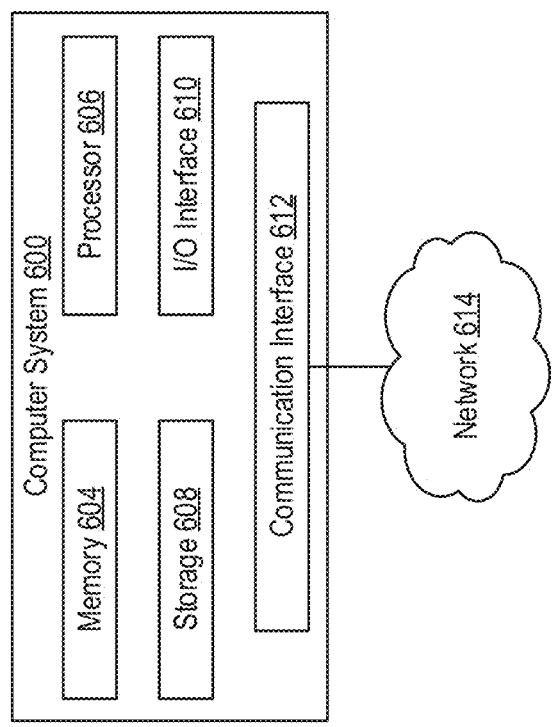
FIG. 6 illustrates a computer system according to an exemplary embodiment of the present disclosure.

FIG. 6 illustrates an example computer system 600 that may be utilized to implement one or more of the devices and/or components of FIG. 2, such as the server 202, the user device 240 and/or the vehicle database 250. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 606, memory 604, storage 608, an input/output (I/O) interface 610, and a communication interface 612. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 606. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below. In particular embodiments, one or more memory management units (MMUs) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory implementations, this disclosure contemplates any suitable memory implementation.

In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, or a Universal Serial Bus (USB) drive or a combination of two or more of these. The storage 608 may include removable or non-removable (or fixed) media, where appropriate. The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608. Although this disclosure describes and illustrates particular storage, this disclosure contemplates any suitable storage.

In particular embodiments, the I/O Interface 610 includes hardware, software, or both, providing one or more interfaces for communication between computer system 600 and one or more I/O devices. The computer system 600 may include one or more of these I/O devices, where appropriate. One or more of these I/O devices may enable communication between a person (i.e., a user) and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 610 may include one or more device or software drivers enabling processor 606 to drive one or more of these I/O devices. The I/O interface 610 may include one or more I/O interfaces 610, where appropriate. Although this disclosure describes and illustrates a particular I/O interface, this disclosure contemplates any suitable I/O interface or combination of I/O interfaces.

In particular embodiments, communication interface 612 includes hardware, software, or both providing one or more interfaces for communication (such as, for example, packet-based communication) between computer system 600 and one or more other computer systems 600 or one or more networks 614. As an example and not by way of limitation, communication interface 612 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 614 and any suitable communication interface 612 for the network 614. As an example and not by way of limitation, the network 614 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 612 for any of these networks, where appropriate. Communication interface 612 may include one or more communication interfaces 612, where appropriate. Although this disclosure describes and illustrates a particular communication interface implementations, this disclosure contemplates any suitable communication interface implementation.

The computer system 602 may also include a bus. The bus may include hardware, software, or both and may communicatively couple the components of the computer system 600 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate.

Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   a processor; and
   a memory storing instructions which, when executed by the processor, cause the processor to:
      generate one or more routes for transportation of a user from an origin location to a destination location, wherein generating the one or more routes comprises:
         identifying a plurality of current vehicle locations of one or more vehicles associated with a primary modality;
         identifying a plurality of locations associated with a secondary modality;
         generating a plurality of first route segments associated with the primary modality to travel between the plurality of current vehicle locations, and the plurality of locations;
         generating a plurality of second route segments associated with secondary modality to travel between the plurality of locations, wherein at least one location of the plurality of current vehicle locations excludes the origin location and at least one location of the plurality of locations excludes the destination locations; and
         recursively updating the plurality of the first route segments as the plurality of current vehicle locations changes over time;
      generate a proposal that identifies a route of the one or more routes for transporting the user from the origin location to the destination location, the proposal including at least one route segment of the plurality of first route segments and at least one route segment of the plurality of second route segments; and
      send, for display, the proposal to a computing device.

2. The system of claim 1, wherein the plurality of locations corresponds to locations of vehicles associated with the secondary modality.

3. The system of claim 1, wherein the plurality of locations is identified to include at least one of: (i) locations closest to the origin location or (ii) locations closest to the destination location.

4. The system of claim 1, wherein the plurality of first route segments and the plurality of second route segments are identified to comply with at least one of:
   a maximum distance requirement, a minimum distance requirement, a maximum time requirement, a minimum time requirement, a time-of-day requirement, or a price requirement.

5. The system of claim 1, wherein the memory stores further instructions which, when executed by the processor while identifying the plurality of locations associated with the secondary modality, cause the processor to:
   identify the plurality of locations as locations associated with a first secondary modality; and
   identify an additional plurality of locations associated with a second secondary modality.

6. The system of claim 5, wherein the plurality of locations correspond to locations of vehicles associated with the first secondary modality, and wherein generating the one or more routes for transportation of the user further comprises:
   generating one or more third route segments that connect the origin location to at least one of the plurality of locations; and
   generating the plurality of second route segments as route segments that connect at least one of the plurality of locations to a starting location of a primary segment utilizing the primary modality.

7. The system of claim 6, wherein the plurality of second route segments utilize the first secondary modality and the one or more third route segments utilize the second secondary modality.

8. The system of claim 7, wherein at least one of the first secondary modality or the second secondary modality includes: transportation by bike, transportation by scooter, transportation by walking, or transportation by automobile.

9. The system of claim 6, wherein the memory stores further instructions which, when executed by the processor, cause the processor to:

identify one or more fourth route segments that connect the plurality of locations to the starting location of the primary segment.

10. The system of claim 9, wherein the one or more fourth route segments are associated with a third secondary modality different from the first secondary modality and the second secondary modality.

11. A method comprising:
generating one or more routes for transportation of a user from an origin location to a destination location, wherein generating the one or more routes comprises:
identifying a plurality of current vehicle locations of one or more vehicles associated with a primary modality;
identifying a plurality of locations associated with a secondary modality;
generating a plurality of first route segments associated with the primary modality to travel between the plurality of current vehicle locations and the plurality of locations;
generating a plurality of second route segments associated with the secondary modality to travel between the plurality of locations, wherein at least one location of the plurality of current vehicle locations excludes the origin location and at least one location of the plurality of locations excludes the destination location; and
recursively updating the plurality of first route segments as the plurality of current vehicle locations changes over time;
generating a proposal that identifies a route of the one or more routes for transporting the user from the origin location to the destination location, the proposal including at least one route segment of the plurality of first route segments and at least one route segment of the plurality of second route segments; and
sending, for display, the proposal to a computing device.

12. The method of claim 11, wherein the plurality of locations correspond to locations of vehicles associated with the secondary modality.

13. The method of claim 11, wherein the plurality of locations is identified to include at least one of: (i) locations closest to the origin location or (ii) locations closest to the destination location.

14. The method of claim 12, wherein the plurality of first route segments and the plurality of second route segments are identified to comply with at least one of:
a maximum distance requirement, a minimum distance requirement, a maximum time requirement, a minimum time requirement, a time-of-day requirement, or a price requirement.

15. The method of claim 11, wherein identifying the plurality of locations associated with the secondary modality further comprises:
identifying the plurality of locations as locations associated with a first secondary modality; and
identifying an additional plurality of locations associated with a second secondary modality.

16. The method of claim 15, wherein the plurality of locations corresponds to locations of vehicles associated with the first secondary modality, and wherein generating the plurality of first route segments and the plurality of second route segments further comprises:
generating one or more third route segments that connect the origin location to at least one of the plurality of locations; and
generating the plurality of second route segments as route segments that connect at least one location of the plurality of locations to a starting location of a primary segment utilizing the primary modality.

17. The method of claim 16, wherein the plurality of second route segments utilize the first secondary modality and the one or more third route segments utilize the second secondary modality.

18. The method of claim 16, further comprising:
identifying one or more route segments that connect the plurality of locations to the starting location of the primary segment.

19. A non-transitory, computer-readable medium storing instructions which, when executed by a processor, cause the processor to:
generate one or more routes for transportation of a user from an origin location to a destination location, wherein generating the one or more routes comprises:
identifying a plurality of current vehicle locations of one or more vehicles associated with a primary modality;
identifying a plurality of locations associated with a secondary modality;
generating a plurality of first route segments associated the primary modality to travel between the plurality of current vehicle locations and the plurality of locations;
generating a plurality of second route segments associated with the secondary modality to travel between the plurality of locations, wherein at least one location of the plurality of current vehicle locations excludes the origin location and at least one location of the plurality locations excludes the destination location; and
recursively updating the plurality of first route segments as the plurality of current vehicle locations changes over time;
generating a proposal that identifies a route of the one or more routes for transporting the user from the origin location to the destination location, the proposal including at least one route segment of the plurality of first route segments and at least one route segment of the plurality of second route segments; and
sending, for display, the proposal to a computing device.

20. The non-transitory, computer-readable medium of claim 19, further comprising generating, upon sending the proposal to the computing device, an updated proposal that identifies an updated route for transporting the user to the destination location.

* * * * *